United States Patent [19]
Kato et al.

[11] Patent Number: 5,664,528
[45] Date of Patent: Sep. 9, 1997

[54] VALVE TIMING CONTROL APPARATUS WITH A RESTRICTING MEANS

[75] Inventors: Senji Kato, Aichi-ken; Atsushi Yasumura, Toyota; Nobuhisa Ohkawa, Toyota; Tadahisa Naganawa, Toyota, all of Japan

[73] Assignee: Toyota Jidosha Kabushiki Kaisha, Toyota, Japan

[21] Appl. No.: 758,703

[22] Filed: Dec. 3, 1996

Related U.S. Application Data

[62] Division of Ser. No. 630,640, Apr. 11, 1996, Pat. No. 5,623,896.

[30] Foreign Application Priority Data

| Apr. 13, 1995 | [JP] | Japan | 7-088441 |
| Aug. 23, 1995 | [JP] | Japan | 7-214986 |

[51] Int. Cl.$^6$ .............................................. F01L 1/344
[52] U.S. Cl. .............................. 123/90.15; 123/90.17
[58] Field of Search .......................... 123/90.15, 90.16, 123/90.17, 90.18, 90.31

[56] References Cited

U.S. PATENT DOCUMENTS

| 4,928,640 | 5/1990 | Van Vuuren et al. | 123/90.17 |
| 5,103,780 | 4/1992 | Ishi | 123/90.15 |
| 5,271,360 | 12/1993 | Kano et al. | 123/90.17 |
| 5,333,577 | 8/1994 | Shinojima | 123/90.15 |
| 5,469,818 | 11/1995 | Yoshioka et al. | 123/90.15 |
| 5,482,012 | 1/1996 | Yoshioka | 123/90.15 |
| 5,522,352 | 6/1996 | Adachi et al. | 123/90.15 |
| 5,529,034 | 6/1996 | Sone et al. | 123/90.15 |
| 5,558,051 | 9/1996 | Yoshioka | 123/90.15 |
| 5,562,071 | 10/1996 | Urushihata et al. | 123/90.15 |
| 5,590,632 | 1/1997 | Kato et al. | 123/90.15 |

FOREIGN PATENT DOCUMENTS

| 59-120707A | 7/1984 | Japan . |
| 63-131808A | 6/1988 | Japan . |
| 4-175429A | 6/1992 | Japan . |
| 4-279705A | 10/1992 | Japan . |
| 2 272 960 | 6/1994 | United Kingdom . |
| 2 288 037 | 10/1995 | United Kingdom . |

*Primary Examiner*—Weilun Lo
*Attorney, Agent, or Firm*—Kenyon & Kenyon

[57] ABSTRACT

A valve timing control apparatus that continuously controls the valve timing of an intake valve or an exhaust valve of an engine. This apparatus includes a hydraulic variable valve timing mechanism, a hydraulic control valve and an electronic control unit for controlling the control valve. The variable valve timing mechanism alters the valve timing to change the valve overlap of the intake valve with respect to the exhaust valve. The hydraulic control valve controls the hydraulic pressure supplied to the variable valve timing mechanism. The real phase of the valve timing is coincided with a target phase that corresponds with the running conditions of the engine. When the real phase of the valve timing approaches the target phase, the hydraulic control valve is controlled to sustain the phase of that instant. The electronic control unit, which learns the control state of the valve-timing sustaining control, sets an initial learning value that reduces the valve overlap when the learning has started. A restricting means for restricting a correction means is included.

8 Claims, 11 Drawing Sheets

VALVE TIMING CONTROL APPARATUS WITH A RESTRICTING MEANS

This is a division of application Ser. No. 08/630,640 filed 11 Apr. 1996, now U.S. Pat. No. 5,623,896.

BACKGROUND OF THE INVENTION

1. Field of the Invention

The present invention relates generally to a valve timing control apparatus that includes a timing change mechanism for controlling the valve timing of the intake valve or exhaust valve of an engine. More particularly, this invention relates to a valve timing control apparatus that continuously controls the valve timing in accordance with the running conditions of the engine.

2. Description of the Related Art

In the conventional engine with an ordinary structure, the intake valve and exhaust valve operate to selectively open or close respective air-intake and exhaust passages, which are connected to the individual combustion chambers. Those valve timings are specifically synchronous with the rotational phase of the crank shaft and thus the timing of the up-and-down movement of the pistons. Therefore, the intake amount into any one of the combustion chambers and the exhaust amount therefrom vary depending on the angle of a throttle valve provided separately in the engine's air-intake passage, or on the speed of the engine.

Various apparatuses are available that alter the valve timing in order to control the intake and exhaust amounts in the combustion chamber with a greater degree of freedom. Such apparatuses include a variable valve timing mechanism for changing the valve timing and a computer for controlling the operation of the variable valve timing mechanism. This computer controls the variable valve timing mechanism in accordance with the running condition of the engine to control the valve timing of the intake valve or the exhaust valve, thereby controlling the degree of valve overlapping of the intake valve and exhaust valve. Accordingly, the amount of the mixture of air and fuel to be supplied to each combustion chamber is controlled to optimize the air-fuel ratio of that mixture so that the engine power and emissions are properly adjusted.

When the engine speed is relatively high, for example, the computer controls the variable valve timing mechanism so as to relatively increase the valve overlapping. Under this control, the efficiency of the supply of air into the combustion chambers is enhanced by utilizing the inertia of the air that passes through the air-intake passage, thus improving the engine power. When the engine speed is relatively low, on the other hand, the computer controls the variable valve timing mechanism so as to relatively decrease the valve overlapping. This control prevents the exhaust gas, once discharged from the combustion chambers, from flowing back to the combustion chambers so that the exhaust gas remaining in the combustion chambers or the ratio of the internal EGR is reduced to prevent the miscombustion of the air-fuel mixture.

Japanese Unexamined Patent Publication No. Hei 4-279705 discloses one example of such a valve timing control apparatus. This apparatus is capable of changing the valve timing continuously and to the desired level in accordance with the running condition of the engine. As shown in FIG. 13, this apparatus has a cam position sensor 91 to detect the rotational position of a cam shaft 92. A crank position sensor 93 detects the rotational position of a crank shaft 94. First and second hydraulic pumps 95 and 96 pump out the oil of an oil pan 97. A variable valve timing mechanism 98, provided at the cam shaft 92, is hydraulically driven to change the rotational phase of the cam shaft 92. This mechanism 98 has a timing pulley 98a and incorporates a ring-shaped piston and a transmission member (both unillustrated), which couple the pulley 98a to the cam shaft 92. As the piston is moved by the hydraulic pressure, the rotational phase of the cam shaft 92 is changed. A hydraulic line 99 connects the second hydraulic pump 96 to the mechanism 98. First and second oil control valves (OCVs) 100 and 101 provided midway in the hydraulic line 99, control the supply of the hydraulic pressure to the mechanism 98. An electronic control unit (ECU) 102 computes the rotational phase of the cam shaft 92, or the target phase associated with the control of the valve timing, based on the value of the rotational speed of the crank shaft 94 (engine speed). The ECU 102 detects the actual phase of the valve timing based on the output signals of both sensors 91 and 93. The ECU 102 compares the detected actual phase with the computed target phase to compute a change value to be used in altering the rotational phase of the cam shaft 92. Based on this computed change value, the ECU 102 performs duty control of the opening s of both OCVs 100 and 101. Accordingly, the mechanism 98 is controlled to provide the optimal valve timing in accordance with the running condition of the engine 103.

To advance the valve timing from the current timing, for instance, the ECU 102 fully closes the second OCV 101 and executes the duty control on the opening of the first OCV 100 in accordance with the aforementioned change value. When the value of a change in the rotational phase of the cam shaft 92 matches with the target value, the ECU 102 fully closes both OCVs 100 and 101 to sustain the valve timing. This control allows the hydraulic line 99 to be tightly closed and maintains the value of a change in the rotational phase of the cam shaft 92, so that the valve timing of that instant is sustained. When the oil leaks from somewhere in the hydraulic line 99, the valve timing may vary. In this respect, the ECU 102 controls both OCVs 100 and 101 while always detecting the valve timing to execute feedback control of the valve timing. To retard the valve timing from the current timing, the ECU 102 fully closes the first OCV 100 and executes duty control on the opening of the second OCV 101 in accordance with the change value. When the value of a change in the rotational phase of the cam shaft 92 matches with the target value, the ECU 102 likewise fully closes both OCVs 100 and 101 to retard the valve timing. This control maintains the value of a change in the rotational phase of the cam shaft 92, so that the valve timing of that instant is sustained.

In this valve-timing sustaining control to sustain the valve timing to the target phase, the apparatus disclosed in the aforementioned publication performs no control to evaluate the control result and to learn a learning value for correcting the valve-timing sustaining control based on the evaluation result. In other words, this prior art lacks optimal learning control in the case where learning control is adapted to the sustaining control.

The output characteristics of the mechanism 98, both OCVs 100 and 101, vary depending on their allowances or their time-dependent changes. The output characteristics also vary depending on the running condition of the engine 103. As the rotational speed of the engine 103 or the warm-up state thereof varies, the levels of the hydraulic pressures acquired by both pumps 95 and 96 differ from each other. This difference in hydraulic pressure causes the output characteristics of the individual members 98, 100, 101, etc.

to vary. To eliminate the influence of the allowances or time-dependent changes of the individual members 98, 100, 101, etc. from the sustaining control, therefore, learning control should be adapted to the sustaining control. For adaptation of the learning control to the sustaining control, there are several problems.

For example, one of the problems is to determine what should be the initial value to be used in the initial learning process in consideration of the allowances or time-dependent changes of the individual members 98, 100, 101, etc. When the initial value is improper, the sustaining control may bring about the improper result during the period in which the initial learning is completed temporarily. Another problem is to determine on what should be the learning value used in the sustaining control when the mechanism 98 recovers from the failure-originated fixed state on the premise that the valve-timing sustaining control should be executed. When an improper learning value is set, the sustaining control may bring about an improper result during the period in which the learning is completed temporarily after the recovery from the failure. If the adjustment of either value is inadequate, the proper valve timing cannot be acquired temporarily. If the valve timing is too advanced temporarily, the valve overlapping becomes too large temporarily and the combustion of the air-fuel mixture in the combustion chambers becomes unstable, which may result in misfire or engine stalling.

In addition, the mechanism 98 may temporarily become inoperable due to mechanical restriction. Such may occur when the piston in the mechanism 98 moves and comes to its end position. In this case, with simple execution of the sustaining control, it is not possible to distinguish the stop of the mechanism 98 by the sustaining control from the stop of the mechanism 98 by the mechanical restriction thereof. When learning control is adapted to the sustaining control, therefore, an inaccurate learning value may be obtained in the learning control. Further, even if the learning value is updated in the learning control, the actual phase of the valve timing may not converge to the target phase.

SUMMARY OF THE INVENTION

Accordingly, it is a primary objective of the present invention to provide a valve timing control apparatus for an engine, which employs learning control in the valve-timing sustaining control for correcting this sustaining control to thereby ensure the elimination of the influence of the allowances or time-dependent changes of the mechanisms of the apparatus on the sustaining control and to execute the optimal learning control during the period from the beginning of new learning to the point of the temporary termination of that learning.

It is another objective of this invention to provide a valve timing control apparatus for an engine, which employs learning control in the valve-timing sustaining control for correcting this sustaining control to thereby ensure the elimination of the influence of the allowances or time-dependent changes of the mechanisms of the apparatus on the sustaining control, and to execute the optimal learning control in consideration of the possibility that the apparatus may become inoperable due to the mechanical restriction.

To achieve the foregoing and other objects and in accordance with the purpose of the present invention, a valve timing control apparatus for engine is provided. The engine has an air intake passage for introducing air to a combustion chamber and an air exhausting passage for exhausting gas from the combustion chamber. The intake passage and the exhausting passage have an intake valve and an exhaust valve, respectively. The valves are alternately opened and closed with a valve timing according to rotation of a cam shaft, which rotates in synchronism with rotation of a crank shaft of the engine. The valves are simultaneously opened during a period of valve overlap. The rotational phase of the cam shaft is arranged to be selectively advanced or retarded with respect to the rotational phase of the crank shaft to converge the valve timing to a target value so as to vary the period of the valve overlap within a range between a maximum value and a minimum value based on a current running condition of the engine. The apparatus comprises adjusting device for continuously adjusting the valve timing of at least one of the intake valve and the exhaust valve. The adjusting device is driven by hydraulic pressure. The apparatus comprises supplying device for supplying the hydraulic pressure to the adjusting device. The supplying device includes tuning device for tuning the hydraulic pressure. The apparatus comprises first detecting device for detecting the running condition of the engine, computing device for computing the target value based on the running condition. The apparatus comprises second detecting device for detecting the actual valve timing adjusted by the adjusting device, control device for controlling the supplying device to operate the adjusting device so as to converge the detected valve timing to the target value and vary the period of the valve overlap based on the running condition of the engine. The control device controls the supplying device to sustain the valve timing when it is approximately coincided with the target value. The apparatus comprises determining device for determining an offset between the detected valve timing and the target value when the valve timing is sustained by the control device for a predetermined time period. The determining device includes calculating device for calculating an offset value between the valve timing and the target value. The apparatus comprises correct device for correcting the control of the control device with a current specific value for cancelling the offset value. The correct device is arranged to compute the current specific value based on the offset value. The correct device is arranged to apply an initial value for an initial computation of the current specific value. The apparatus comprises storage device for storing the initial value. The initial value is preset to control the adjusting device so as to decrease the period of the valve overlap with respect to the maximum value.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

With reference to FIGS. 1 through 10, a detailed description will be now given of a valve timing control apparatus according to a first preferred embodiment of the present invention as adapted for use in a gasoline engine system of a vehicle.

Figure 1:
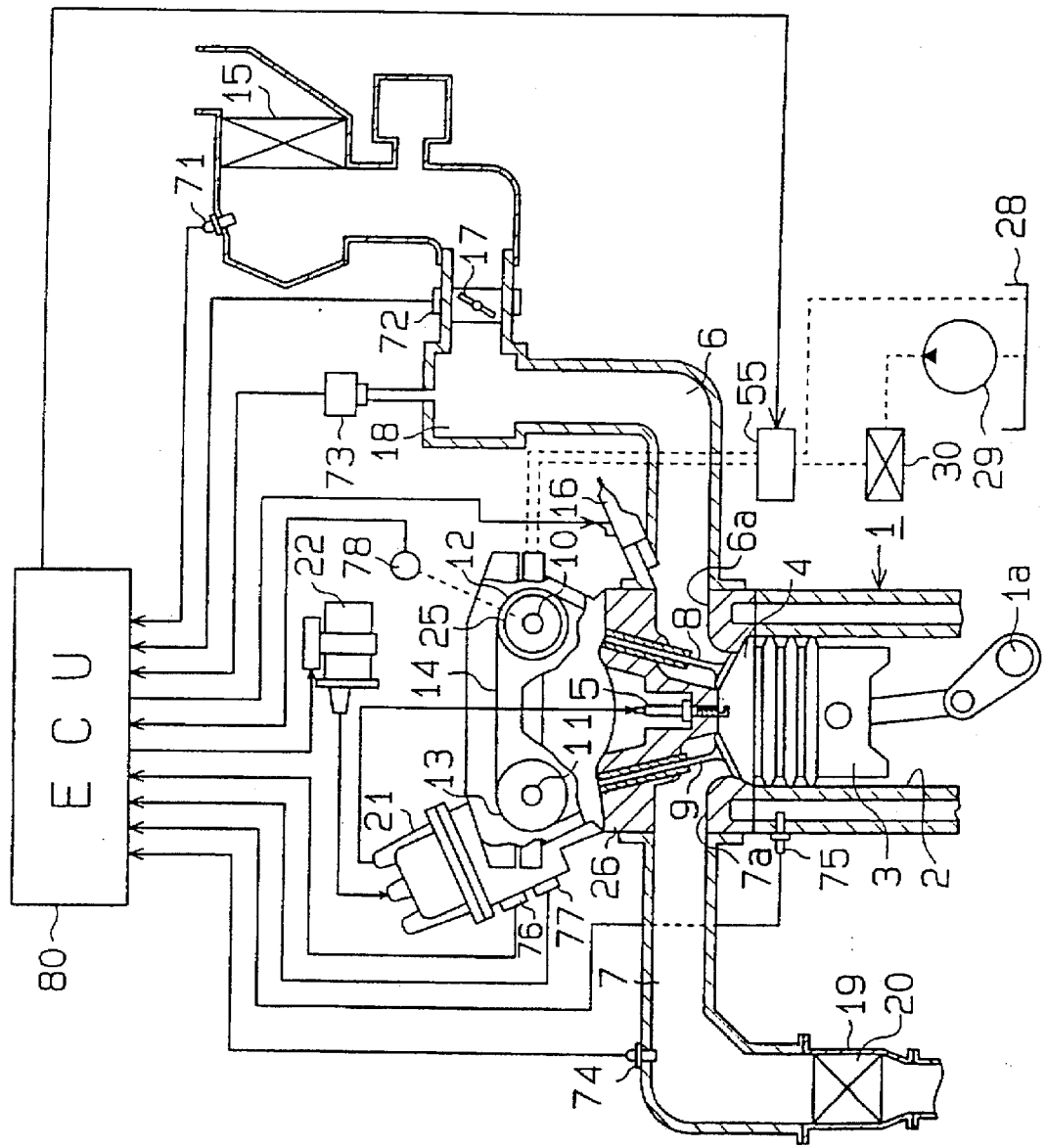
FIG. 1 is a schematic structural diagram illustrating a gasoline engine system.

FIG. 1 illustrates the schematic structure of a gasoline engine system mounted in a vehicle (not shown). An engine 1 has a plurality of cylinders 2, which retain pistons 3. Those pistons 3 are coupled to a crank shaft 1a and are movable up and down in the associated cylinders 2. In each cylinder 2, a combustion chamber 4 is located above the piston 3. A plurality of ignition plugs 5, which are provided in association with the individual combustion chambers 4, ignite a flammable air-fuel mixture supplied to each combustion chamber 4. An intake port 6a and an exhaust port 7a, provided in association with each combustion chamber 4, respectively, constitute a part of an air-intake passage 6 and a part of an exhaust passage 7. An intake valve 8 and an exhaust valve 9 provided in association with each combustion chamber 4 selectively open or close the respective ports 6a and 7a. Those valves 8 and 9 function based on the rotations of different cam shafts 10 and 11. Timing pulleys 12 and 13, which are respectively provided at the distal ends of the cam shafts 10 and 11, are coupled to the crank shaft 1a by a timing belt 14.

When the engine 1 runs, therefore, the torque of the crank shaft 1a is transmitted with the timing belt 14 and the timing pulleys 12 and 13 to the cam shafts 10 and 11, actuating the valves 8 and 9. The valves 8 and 9 can function at predetermined timings in synchronism with the rotation of the crank shaft 1a or in synchronism with a sequence of operation strokes (the suction stroke, the compression stroke, the combustion and expansion stroke, and the exhaust stroke) according to the up and down movement of each piston 3.

An air cleaner 15 provided at the inlet side of the air-intake passage 6 cleans the outside air drawn into the air-intake passage 6. Injectors 16 provided near the respective intake ports 6a inject fuel into the intake ports 6a. When the engine 1 runs, the air is led via the air cleaner 15 into the air-intake passage 6. At this time, the fuel injected from each injector 16 is mixed with the air, and this air-fuel mixture is led into the associated combustion chamber 4 when the associated intake port 6a is opened by the intake valve 8 during the suction stroke. The air-fuel mixture supplied into the combustion chamber 4 is ignited and burned by the associated ignition plug 5. As a result, the piston 3 moves to rotate the crank shaft 1a, generating the driving power in the engine 1. The exhaust gas after combustion is discharged out of the combustion chamber 4 via the exhaust passage 7 when the exhaust port 7a is opened by the exhaust valve 9 in the exhaust stroke.

A throttle valve 17 provided midway in the air-intake passage 6 responds to the manipulation of an acceleration pedal (not shown). The amount of air taken into the air-intake passage 6, i.e., the air-intake amount Q is controlled by adjusting the opening of this valve 17. A surge tank 18 provided downstream of the valve 17 dampers the pulsation of air flowing through the air-intake passage 6. An air temperature sensor 71, provided in the vicinity of the air cleaner 15, detects an intake-air temperature THA and produce a signal corresponding to the detected value. A throttle sensor 72, provided in the vicinity of the throttle valve 17, detects the opening TA, of the valve 17 (throttle opening) and produces a signal corresponding to the detected value. When the throttle valve 17 is fully closed, the throttle sensor detects it and sends a signal. A manifold pressure sensor 73, provided in the surge tank 18, detects a manifold pressure PM and produces a signal corresponding to the detected value.

A catalytic converter 19, provided midway in the exhaust passage 7, cleans the exhaust gas with an incorporated three way catalyst 20. Further, an oxygen sensor 74 provided midway in the exhaust passage 7 detects the oxygen density Ox in the exhaust gas and produces a signal corresponding to the detected value. A coolant temperature sensor 75 provided in the engine 1 detects the temperature, THW, of the coolant in the engine 1 and produces a signal corresponding to the detected value.

A distributor 21 distributes a high voltage, output from an igniter 22, as an ignition signal to activate the individual ignition plugs 5. The ignition timing of each ignition plug 5 is therefore determined by the timing at which the high voltage is released from the igniter 22.

A rotor (not shown) incorporated in the distributor 21 rotates in synchronism with the rotation of the crank shaft 1a with the cam shaft 11. An engine speed sensor 76 provided in the distributor 21 detects the rotational speed of the engine 1 (engine speed) NE in accordance with the rotation of the rotor and sends the detected value as a pulse signal. A timing sensor 77 also provided in the distributor 21 detects the reference position, GP, of the rotational phase of the crank shaft 1a at a predetermined rate in accordance with the rotation of the rotor and also sends the detected value as a pulse signal. In this embodiment, the crank shaft 1a rotates twice for one sequence of operational strokes of the engine 1, and the engine speed sensor 76 outputs one pulse signal every crank angle CA of 30 degrees while the crank shaft 1a rotates twice. The timing sensor 77 sends one pulse signal every crank angle CA of 360 degrees.

In this embodiment, a variable valve timing mechanism (hereinafter simply referred to as "VVT") 25, which is provided in the timing pulley 12, serves to alter the actuation timing of the intake valve 8. The structure of the VVT 25, which is a hydraulic type, will be described below in detail.

Figure 2:
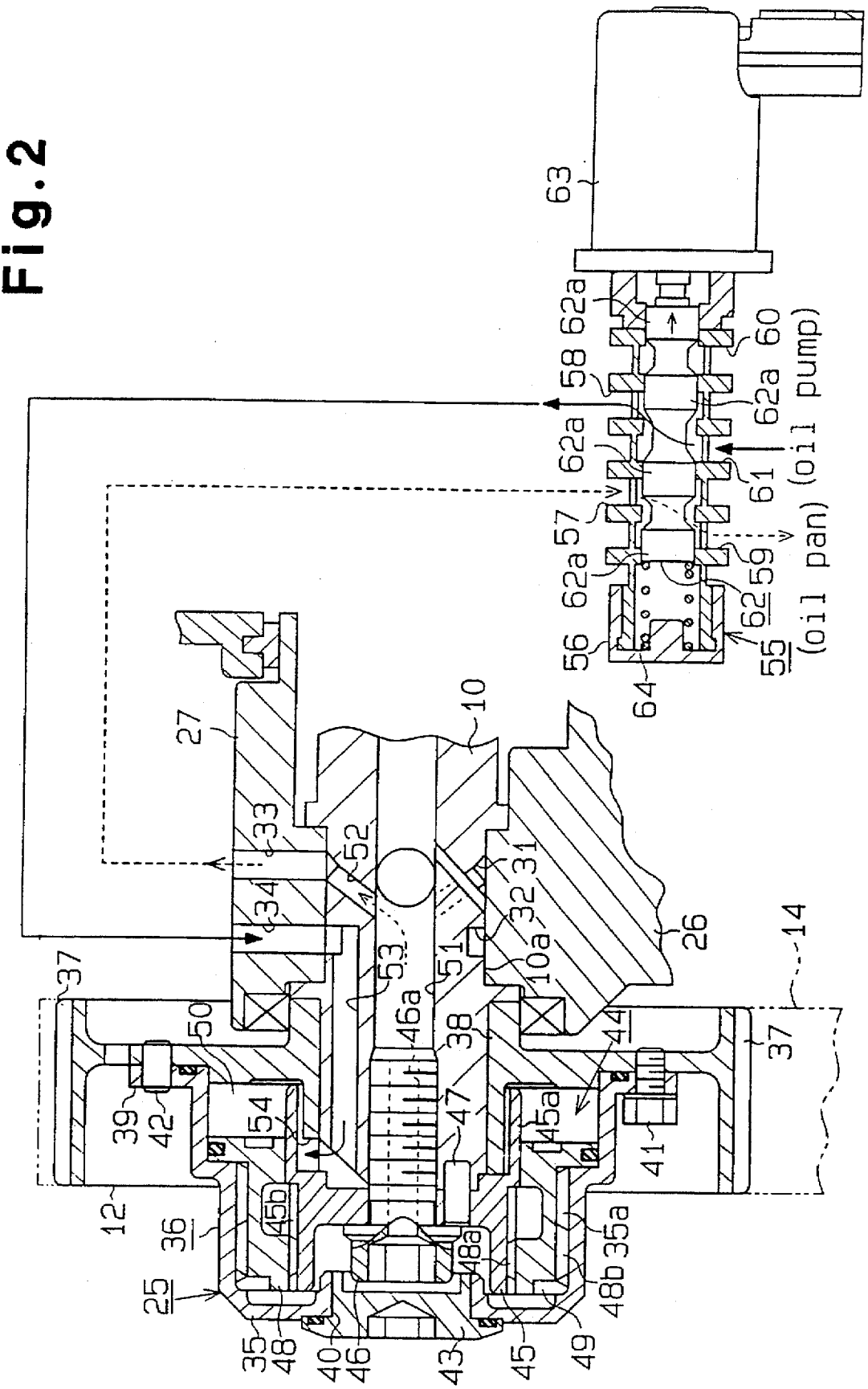
FIG. 2 is a partial cross-sectional diagrammatic view showing the structures of a variable valve timing mechanism (VVT) and a linear solenoid valve (LSV)
Figure 3:
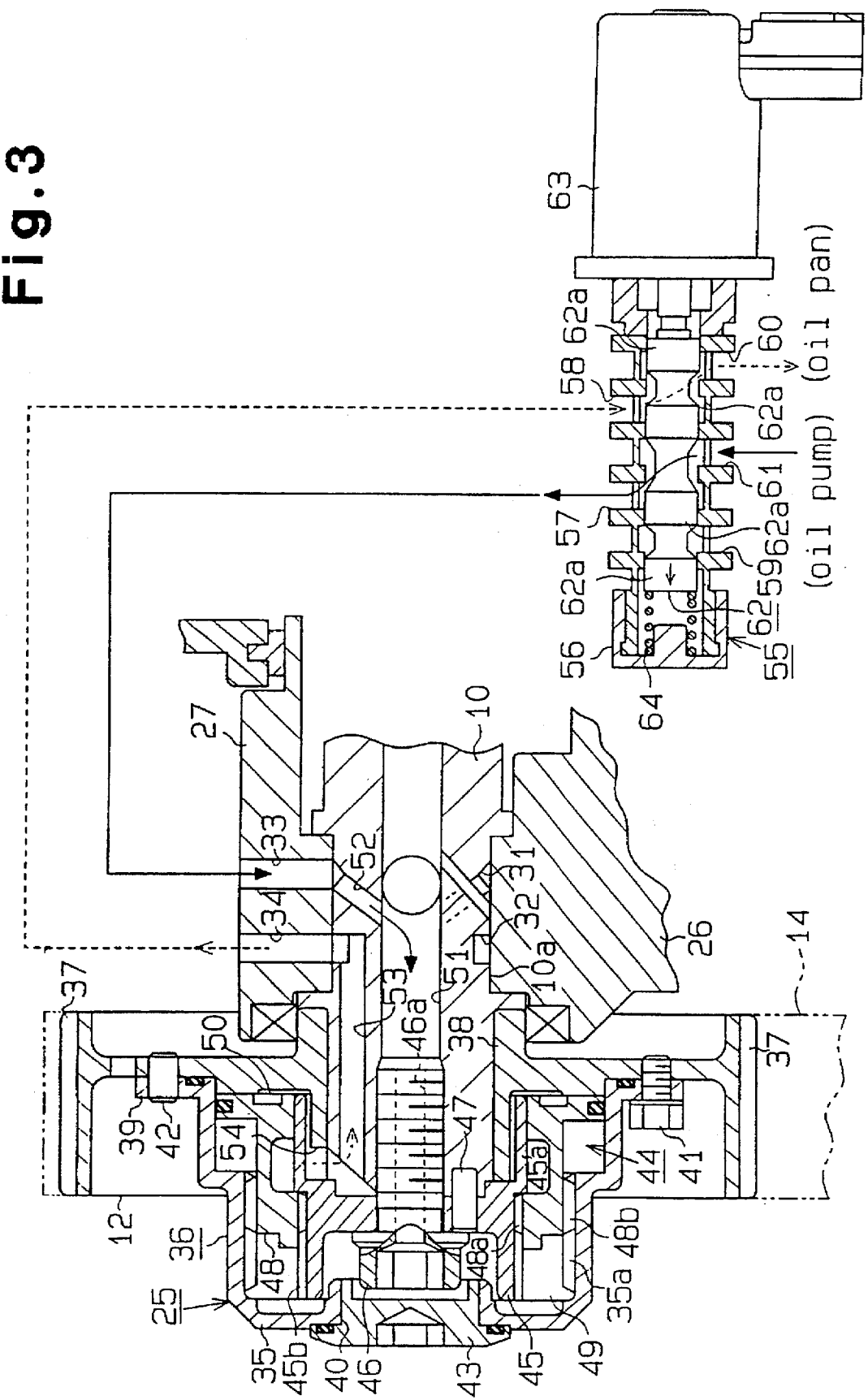
FIG. 3 is a partial cross-sectional diagrammatic showing the structures of the VVT and LSV.

FIGS. 2 and 3 depict the structures of the VVT 25 and a linear solenoid valve (LSV) 55 accompanying the VVT 25. A cylinder head 26 and bearing cap 27 of the engine 1 rotatably support the cam shaft 10 with a journal 10a. The VVT 25 is integrally provided with the timing pulley 12 at the distal end of the cam shaft 10. Two oil grooves 31 and 32 provided in the journal 10a extend along the outer surface of the journal 10a. Oil passages 33 and 34 provided in the bearing cap 27 supply lubricating oil to the journal 10a and the oil grooves 31 and 32. In this embodiment, as shown in FIG. 1, an oil pan 28, an oil pump 29, an oil filter 30 and the associated oil passages constitute a lubricating device for supplying lubricating oil to various locations in the engine 1. This lubricating device provides the VVT 25 with hydraulic pressure through the lubricating oil. The LSV 55 adjusts the hydraulic pressure supplied to the VVT 25.

As the oil pump 29 functions in response to the running of the engine 1, the lubricating oil pumped out of the oil pan 28 is discharged from the pump 29. The discharged lubricating oil passes through the oil filter 30 and is selectively supplied under pressure through the individual oil passages 33 and 34 to the oil grooves 31 and 32 and the journal 10a by the LSV 55.

The timing pulley 12, having an approximate disk shape, and a cylindrical cover 35, which is attached to the pulley 12, constitute a housing 36. The cover 35 covers one side of the pulley 12 and the distal end of the cam shaft 10. The pulley 12 has a plurality of external teeth 37 on its outer surface and a boss 38 in the center. The pulley 12, which is journalled at the boss 38 to the cam shaft 10, is rotatable relative to the cam shaft 10. The aforementioned timing belt 14 is coupled to the external teeth 37.

The cover 35 has a flange 39 on one end and a hole 40 formed in the center of the opposite end. A plurality of bolts 41 and pins 42 secure the flange 39 to one side of the pulley 12. A removable lid 43 is attached to the hole 40. The cover 35 has a plurality of internal teeth 35a formed on its inner surface.

Space 44 defined by the pulley 12 and the cover 35 retains an inner cap 45 having a generally cylindrical form. A hollow bolt 46 and a pin 47 secure the cap 45 to the distal end of the cam shaft 10. The inner cap 45 has a wall 45a that encloses part of the boss 38, and the inner cap 45 and the boss 38 may rotate relative to each other. The inner cap 45 has a plurality of external teeth 45b on its outer surface.

A cylindrical ring gear 48, located between the housing 35 and the cap 45, couples the housing 35, and thus the pulley 12, to the cam shaft 10. The ring gear 48 is accommodated in the space 44 and is movable in the axial direction of the cam shaft 10. The ring gear 48 has a plurality of helical teeth 48a on its inner surface and a plurality of helical teeth 48b on its outer surface. The internal teeth 48a of the ring gear 48 engage with the external teeth 45b of the cap 45 and the external teeth 48b of the ring gear 48 engage with the internal teeth 35a of the cover 35. As the ring gear 48 moves along the cam shaft 10, it rotates relative to the cam shaft 10.

As the pulley 12 rotates, the cam shaft 10 is driven through the cover 35, the ring gear 48, and the inner cap 45.

As shown in FIGS. 2 and 3, the space 44 includes first and second hydraulic pressure chambers 49 and 50 defined by the ring gear 48. The first hydraulic pressure chamber 49 is located between the left side (as viewed in FIGS. 2 and 3) of the ring gear 48 and the distal end of the cover 35. The second hydraulic pressure chamber 50 is located between the right side (as viewed in FIGS. 2 and 3) of the ring gear 48 and the web of the pulley 12.

The cam shaft 10 has an oil passage 51 inside extending in its axial direction in order to supply the hydraulic pressure produced by the lubricating oil to the first hydraulic pressure chamber 49. The distal end of this oil passage 51 is connected to the first hydraulic pressure chamber 49 via an axial hole 46a in the hollow bolt 46. The proximal end of the oil passage 51 is connected to the oil groove 31 via an oil hole 52 extending in the radial direction of the cam shaft 10.

The cam shaft 10 has another oil passage 53 inside extending parallel to the oil passage 51 in order to supply the hydraulic pressure produced by the lubricating oil to the second hydraulic pressure chamber 50. An oil hole 54 formed in the boss 38 connects the second hydraulic pressure chamber 50 to the oil passage 53.

In the above-described structure, the oil passage 33, oil hole 52, oil passage 51, and hole 46a constitute a first supply passage for supplying the hydraulic pressure produced by the lubricating oil to the first hydraulic pressure chamber 49, and the oil passage 34, oil passage 53, and oil hole 54 constitute a second supply passage for supplying the hydraulic pressure produced by the lubricating oil to the second hydraulic pressure chamber 50. The LSV 55, connected to both supply passages, controls the hydraulic pressure to be supplied to the individual hydraulic pressure chambers 49 and 50 as it undergoes the duty control. FIG. 1 illustrates how the LSV 55 is connected to the oil pan 28, oil pump 29 and oil filter 30.

As shown in FIGS. 2 and 3, a casing 56 of the LSV 55 has first to fifth ports 57, 58, 59, 60 and 61, respectively. The first port 57 communicates with the oil passage 33, and the second port 58 communicates with the oil passage 34. The third and fourth ports 59 and 60 communicate with the oil pan 28, and the fifth port 61 communicates with the discharge side of the oil pump 29 via the oil filter 30. A spool 62, provided inside the casing 56, has four cylindrical valve bodies 62a. The spool 62 can reciprocate in its axial direction. An electromagnetic solenoid 63 provided in the casing 56 causes the spool 62 to move between a first position shown in FIG. 2 and a second position shown in FIG. 3. The first position is the rightmost (as viewed in FIGS. 2 and 3) position the spool 62 can reach with respect to the casing 56, i.e., the position where the spool 62 is retracted. The second position is the leftmost (as viewed in FIGS. 2 and 3) position the spool 62 can reach with respect to the casing 56, i.e., the position where the spool 62 is extended. A spring 64 provided in the casing 56 urges the spool 62 toward the retracted position.

When the spool 62 is extended against the urging force of the spring 64, the discharge side of the oil pump 29 communicates with the oil passage 33 and the oil passage 34 communicates with the oil pan 28, as shown in FIG. 3. As a result, hydraulic pressure is supplied to the first hydraulic pressure chamber 49 and the ring gear 48 rotates while moving in the axial direction against the pressure of the oil remaining in the second hydraulic pressure chamber 50. The oil in the second hydraulic pressure chamber 50 is drained into the oil pan 28. Consequently, the rotational phases of the cam shaft 10 and the housing 36 change relatively. More specifically, the rotational phase of the cam shaft 10 becomes advanced with respect to the rotational phase of the housing 36. As a result, the phase of the valve timing of the intake valve 8 becomes advanced with respect to the rotational phase of the crank shaft 1a.

Figure 5A:
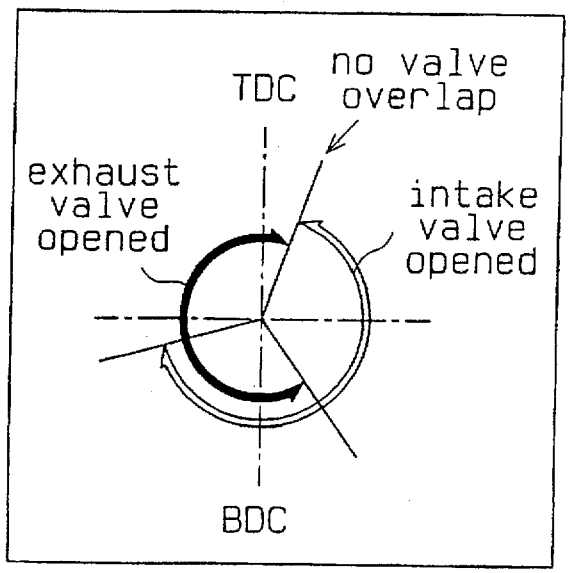
FIGS. 5(a) and 5(b) are explanatory diagrams illustrating changes in valve overlapping.
Figure 5B:
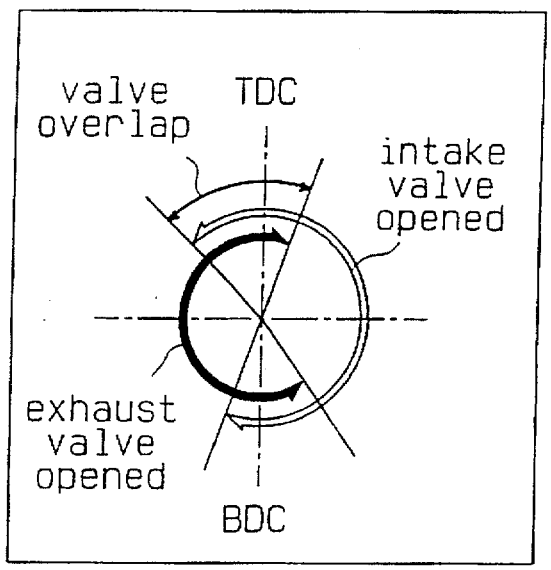
Figure 6:
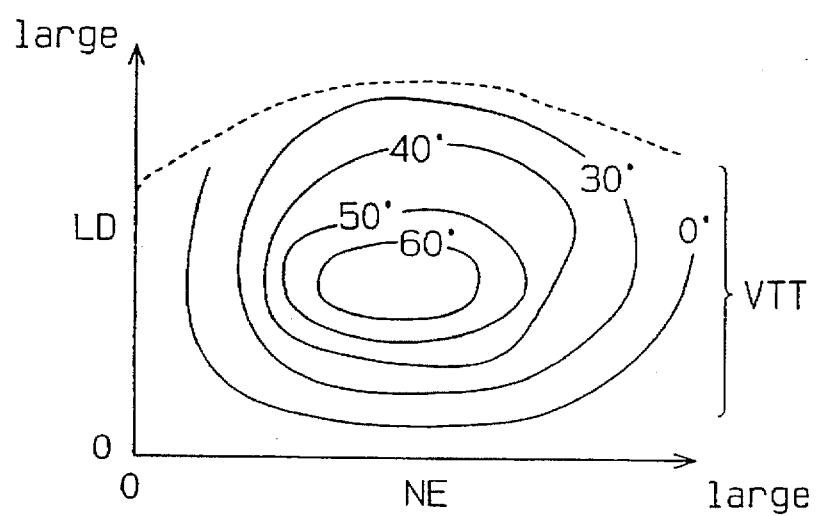
FIG. 6 is a graph illustrating the target displacement angle as a function of the engine rotation speed and engine load.

In this case, as shown in FIG. 5(b), the valve timing of the intake valve 8 advances relatively, increasing the valve overlap between the intake valve 8 and the exhaust valve 9 during the suction stroke. As the hydraulic pressure to be supplied to the first hydraulic pressure chamber 49 is controlled, the ring gear 48 can be moved to the end of its travel against the timing pulley 12 as shown in FIG. 3. When the ring gear 48 reaches this position, the valve timing of the intake valve 8 becomes most advanced and the valve overlap becomes maximum.

As the spool 62 is retracted, the discharge side of the oil pump 29 communicates with the oil passage 34 and the oil passage 33 communicates with the oil pan 28, as shown in FIG. 2. As a result, hydraulic pressure is supplied to the second hydraulic pressure chamber 50 and the ring gear 48 rotates while moving in the axial direction against the pressure of the oil remaining in the first hydraulic pressure chamber 49. The oil in the first hydraulic pressure chamber 49 is drained into the oil pan 28. Consequently, the rotational phase of the cam shaft 10 with respect to the rotational phase of the housing 36 changes in the opposite direction to that of the previous case. More specifically, the rotational phase of the cam shaft 10 becomes retarded with respect to the rotational phase of the housing 36. As a result, the phase of the valve timing of the intake valve 8 becomes retarded with respect to the rotational phase of the crank shaft 1a.

In this case, as shown in FIG. 5(a), the valve timing of the intake valve 8 retards relatively, causing a relative reduction of the valve overlap between the intake valve 8 and the exhaust valve 9 during the suction stroke. In this diagram, there is no valve overlap. As the hydraulic pressure supplied to the second hydraulic pressure chamber 50 is controlled, the ring gear 48 can be moved to the end of its travel toward the cover 35 as shown in FIG. 2. When the ring gear 48 reaches this end position, the valve timing of the intake valve 8 lags most and the valve overlap is minimum.

As the spool 62 comes to positions between the retracted and extended positions, the area of the oil flow passage to each hydraulic pressure chamber 49 or 50 varies and the rate of the valve timing changes will vary accordingly. When the spool 62 is positioned approximately midway between the retracted and extended positions, the oil passages 33 and 34 are disconnected from the oil pump 29 and oil pan 28. Consequently, the supply of the hydraulic pressure to each hydraulic pressure chamber 49 or 50 is restricted so that the operation of the VVT 25 stops, thus stopping the alteration of the valve timing.

As the VVT 25 is properly controlled in the above-described manner, the valve timing of the intake valve 8, and thus the valve overlap, can be changed continuously (steplessly) from the range shown in FIG. 5(a) to the range shown in FIG. 5(b).

Figure 7:
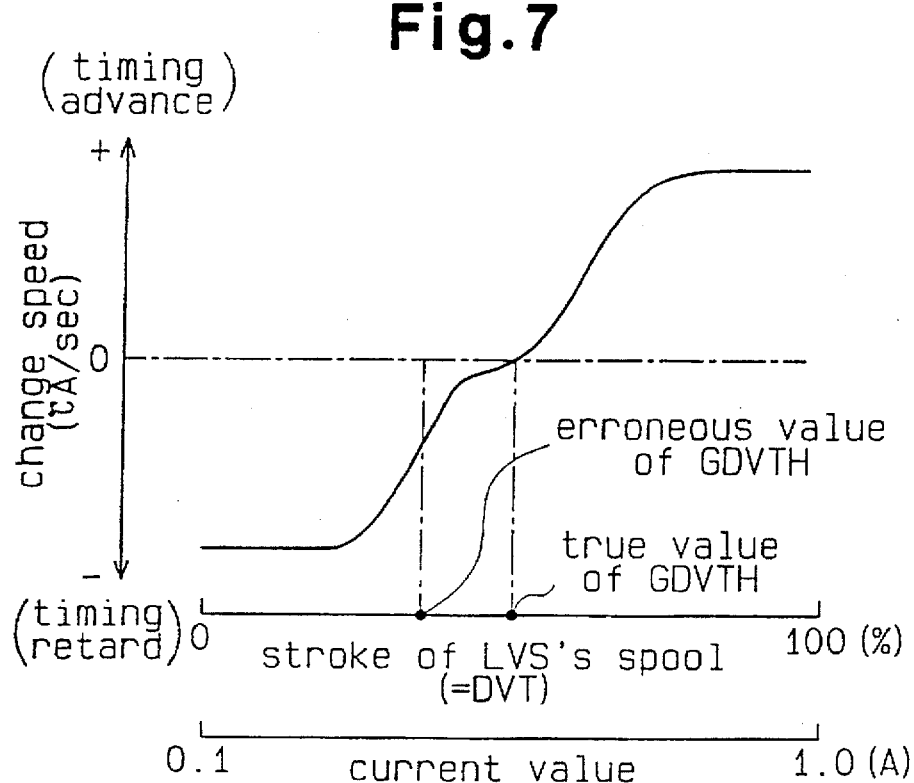
FIG. 7 is a graph illustrating the timing change speed as a function of the spool position of the LSV.

The characteristics of the LSV 55 are shown in the graph in FIG. 7. The horizontal scale in the graph represents the position of the spool 62, and the vertical scale represents the rate of the change in the valve timing (advance rate and retard rate) provided by the VVT 25. The position of the spool the horizontal scale is proportional to the size of the drive duty ratio DVT for controlling the LSV 55, and is proportional to the value of the current to be supplied to the electromagnetic solenoid 63. In this embodiment, the valve timing is controlled by controlling the LSV 55 based on the value of a predetermined drive duty ratio DVT. To set the valve timing to the target value, the drive duty ratio DVT is used as a parameter for controlling the LSV 55 in this embodiment. The change rate of the valve timing, not the change angle thereof, is determined by altering the value of the drive duty ratio DVT. In other words, when the spool 62 is moved by controlling the LSV 55 based on the drive duty ratio DVT, the integration amount of the drive duty ratio DVT becomes the change angle of the valve timing after the shifting of the spool 62.

As shown in FIG. 1, a cam sensor 78 provided at the cam shaft 10 detects an actual displacement angle VT in the rotational angle of the cam shaft 10 and sends a signal corresponding to the detected value. The cam sensor 78 has a plurality of projections arranged at equiangular distances on the cam shaft 10 and a pickup coil located to face each projection. As the cam shaft 10 rotates and each projection crosses the pickup coil, the coil generates an electromotive force. The cam sensor 78 sends the electromotive force as a pulse signal indicative of the actual displacement angle VT.

As shown in FIG. 1, an electronic control unit (ECU) 80 receives signals sent by the aforementioned individual sensors 71 to 78. Based on those signals, the ECU 80 properly controls the driving of the individual components 16, 22 and 55.

Figure 4:
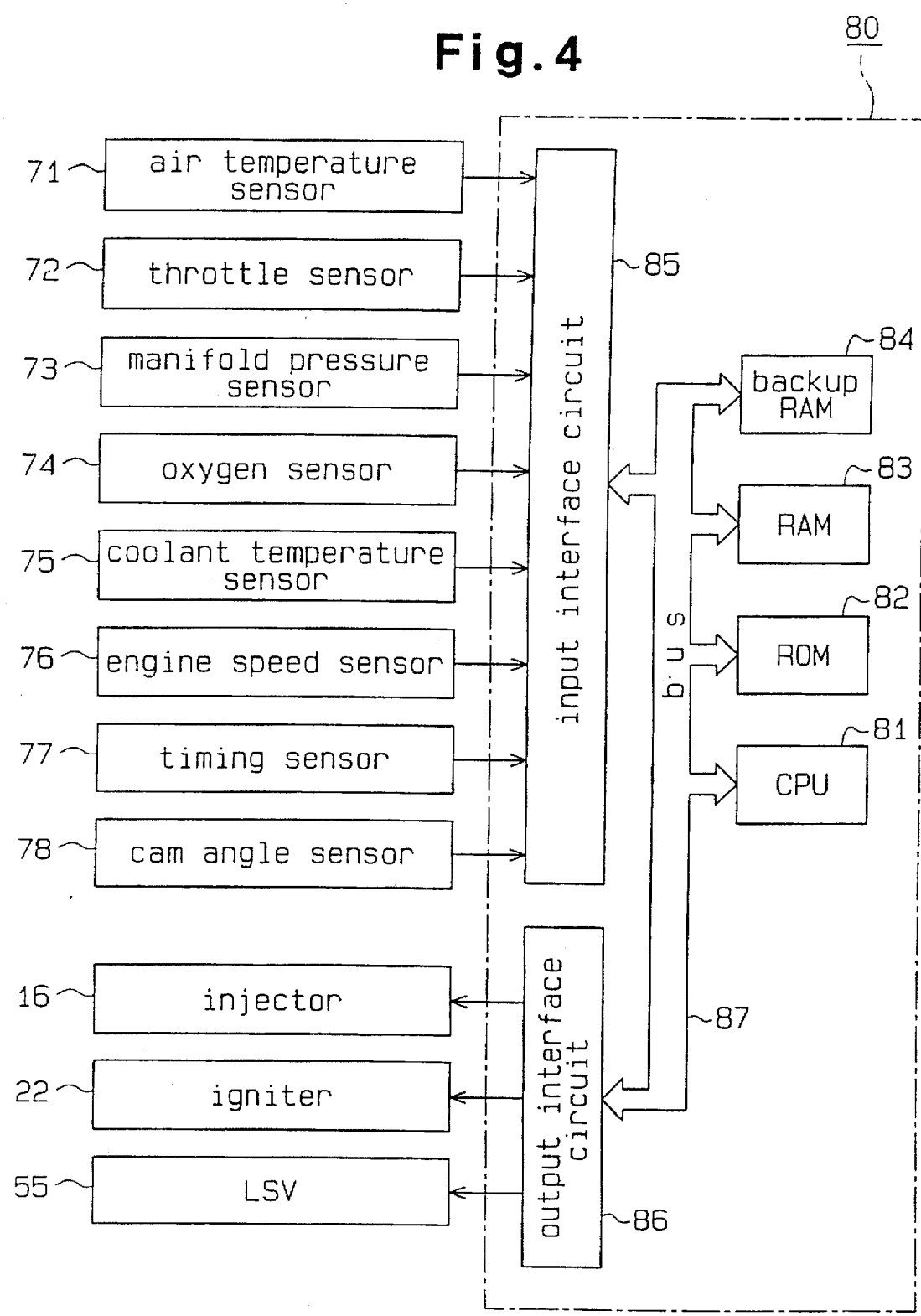
FIG. 4 is a block diagram showing the structure of an electronic control unit (ECU)

The ECU 80 includes a central processing unit (CPU) 81, a read only memory (ROM) 82, a random access memory (RAM) 83 and a backup RAM 84 as shown in a block diagram in FIG. 4. The ECU 80 has those components 81 to 84 connected to an input interface circuit 85 including an A/D converter and an output interface circuit 86 by a bus 87, thus constituting an arithmetic logic unit. In this embodiment, the CPU 81 also has the function of a counter. Predetermined control programs are previously stored in the ROM 82. The RAM 83 temporarily stores the results of the operations performed by the CPU 81. The backup RAM 84 retains prestored data. The aforementioned individual sensors 71 to 78 are connected to the input interface circuit 85, and the aforementioned components 16, 22 and 55 to the output interface circuit 86. This ECU 80 receives power from a power-supply battery (not shown).

The CPU 81 reads the signals from the sensors 71 to 78 received via the input interface circuit 85, as input values. Based on the input values, the CPU 81 properly controls the driving of the individual components 16, 22, 55, etc. to execute various controls, such as the fuel injection control, ignition timing control and valve timing control.

The fuel injection control refers to control of each injector 16 based on a target value, which is computed in accordance with the running condition of the engine 1, to control the amount of fuel supplied to each combustion chamber 4. The ignition timing control refers to control of the igniter 22 based on a target value, which is computed in accordance with the running condition of the engine 1, to control the ignition timing of each ignition plug 5.

The valve timing control refers to control of the activation of the LSV 55 based on the drive duty ratio DVT, which is computed in accordance with the running condition of the engine 1, to control the VVT 25, thereby controlling the actuation timing of the intake valve 8 and the valve overlap. In this embodiment, the valve timing control includes the valve-timing sustaining control and learning control. The sustaining control is for sustaining the valve timing to a given phase. The learning control is for learning a sustaining-duty learning value GDVTH for evaluating and correcting the result of the sustaining control.

The ROM 82 holds previously stored programs for executing those controls, and also holds a previously stored initial value GDVTHI associated with the learning value GDVTH. In the initial learning, the ECU 80 (CPU 81) uses the initial value GDVTHI as the learning value GDVTH. This initial value GDVTHI allows the VVT 25 to be controlled to relatively reduce the valve overlap. The initial value GDVTHI permits the learning value GDVTH to be initialized to a predetermined value when the VVT 25 is in failure. Therefore, for example, the initial value GDVTHI is used as the learning value GDVTH when the engine 1 is activated for the first time after manufacturing, when the engine 1 is activated for the first time after the battery is replaced, or when the VVT 25 is in failure.

Figure 9:
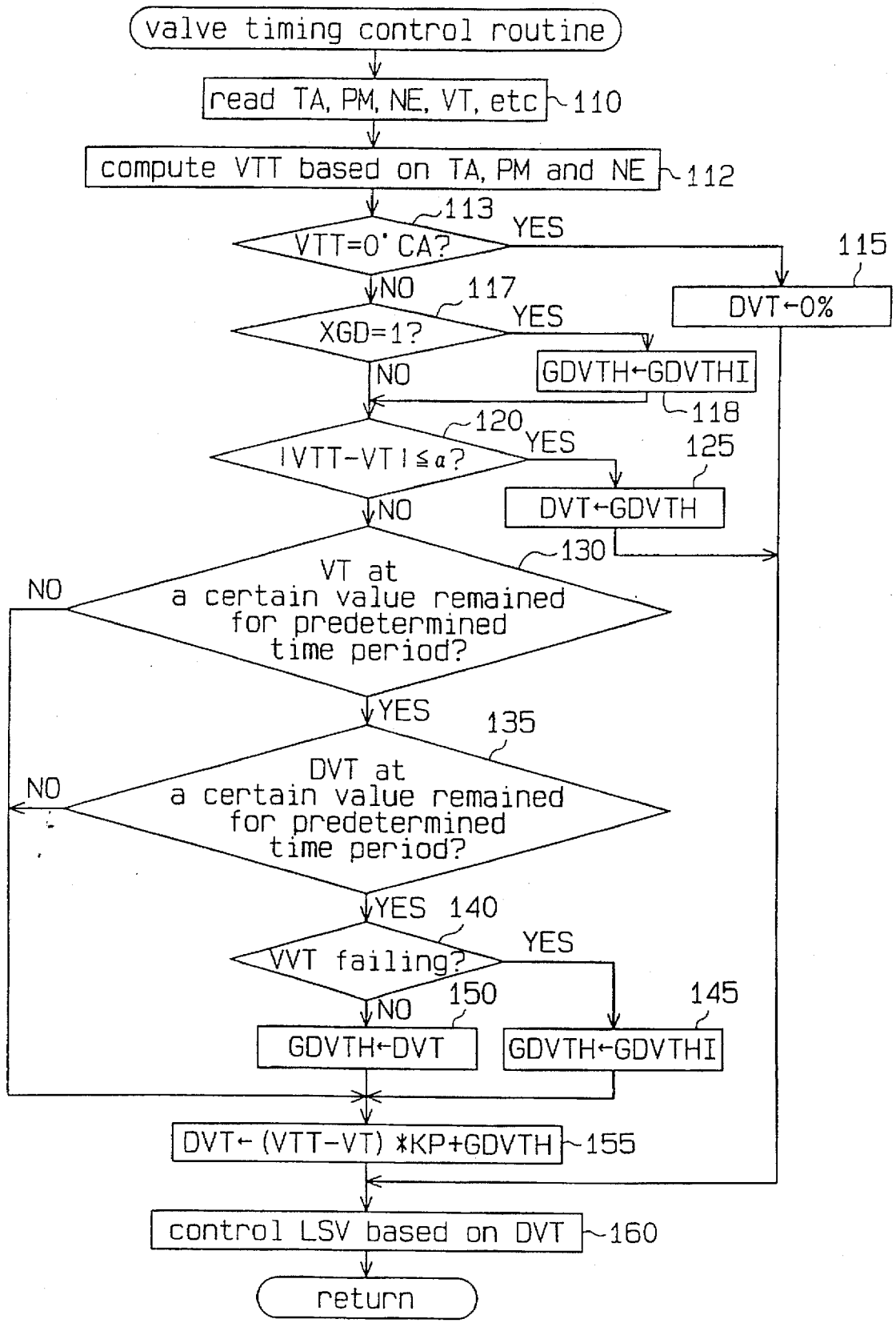
FIG. 9 is a flowchart illustrating a "valve timing control routine"

The valve timing control will be described below in detail. FIG. 9 presents a flowchart illustrating a "valve timing control routine". The ECU 80 periodically executes this routine at predetermined time intervals.

When the process enters this control routine, first, the ECU 80 receives input values associated with the throttle opening TA (including the fully-closed state of the throttle valve 17), manifold pressure PM, engine speed NE, and the actual displacement angle VT based on the signals from the individual sensors 72, 73, 76 and 78 at step 110.

At step 112, the ECU 80 computes the value of a target displacement angle VTT for controlling the VVT 25, based on the values of the currently read parameters TA, PM and NE. The ECU 80 computes the value of the target displacement angle VTT by referring to function data shown on the graph in FIG. 6. In the function data, the target displacement angle VTT is optimally predetermined through experiments from the relationship between the load LD of the engine 1, which is acquired from the manifold pressure PM and the engine speed NE. In this function data, the value of the target displacement angle VTT is set within a range from "zero degrees CA," which is the most retarded value, to "60 degrees CA," which is the most advanced value. The range from "zero degrees CA" to "60 degrees CA" is exemplary.

At step 113, the ECU 80 determines if the value of the currently-computed target displacement angle VTT is "zero degrees CA" or if the valve timing should be controlled to the most retarded state (maximum retarded timing). When the value of the target displacement angle VTT is "zero degrees CA", the ECU 80 executes steps 115 and 160 to control the valve timing to the maximum retarded timing.

More specifically, the ECU 80 sets the value of the drive duty ratio DVT used for the duty control of the LSV 55 to "zero %" at step 115, and performs the duty control of the LSV 55 based on the value of the drive duty ratio DVT to control the change angle of the cam shaft 10 at step 160. To control the LSV 55, the ECU 80 converts the drive duty ratio DVT of "zero %" to the current value for the duty control of the LSV 55. As a result, the VVT 25 controls the valve timing to the maximum retarded timing, at which there is no valve overlap. When the value of the target displacement angle VTT is not "zero degrees CA" at step 113, the ECU 80 proceeds to step 117.

At step 117, the ECU 80 determines if a learn flag XGD is "1". This flag XGD indicates whether or not the learning control should be executed first when the engine 1 is activated for the first time or when the engine 1 is activated for the first time after the battery has been replaced. The ECU 80 sets this flag XGD according to another processing routine (not shown). More specifically, the ECU 80 sets the flag XGD to "1" when the learning control is to be executed first, and sets the flag XGD to "zero" otherwise.

When it is determined that the learning control should be executed first at step 117, the ECU 80 sets the initial value GDVTHI stored in the ROM 82 as the sustaining duty learning value GDVTH at step 118 after which the ECU 80 proceeds to step 120. In other words, the ECU 80 initializes the sustaining duty learning value GDVTH to the initial value GDVTHI. When it is determined that the flag XGD is zero at step 117, the ECU 80 proceeds to step 120.

At step 120, the ECU 80 determines if the difference (absolute value) between the currently computed value of the target displacement angle VTT and the currently read actual displacement angle VT is equal to or smaller than a predetermined reference value α. "3 degrees CA" may be set to the reference value α. When the difference is greater than the reference value α at step 120, the ECU 80 executes the processes at steps 130 to 160 to execute the feedback control and learning control.

At step 130, the ECU 80 determines if the value of the actual displacement angle VT has converged to a certain value and remained the same for a predetermined time period. When the actual displacement angle VT value has not remained the same for a predetermined time period, which means that the value of the angle VT is changing, the ECU 80 executes the processes at steps 155 and 160. When the value of the actual displacement angle VT has converged to the certain value and has remained the same for the predetermined time period, the ECU 80 proceeds to step 135.

At step 135, the ECU 80 determines if the value of the drive duty ratio DVT has converged to a certain value and remained the same for a predetermined time period. When the drive duty ratio DVT at the certain value has not remained the same for a predetermined time, which means that the ratio DVT is changing, the ECU 80 executes the processes at steps 155 and 160. When the drive duty ratio DVT has remained at the certain value for the predetermined time, which means that the ratio DVT has converged to the certain value, the ECU 80 proceeds to step 140.

At step 155, as advanced from step 130 or step 135, the ECU 80 computes the value of the drive duty ratio DVT from the following equation.

$$DVT=(VTT-VT)*KP+GDVTH$$

where KP is a constant equivalent to the gain of the proportional control.

In the next step 160, as mentioned earlier, the ECU 80 controls the LSV 55 based on the computed value of the drive duty ratio DVT, thereby causing the VVT 25 to control the valve timing and valve overlap.

At step 140 as proceeded from step 135, the ECU 80 determines if the VVT 25 is failing. The failure of the VVT 25 here means that the phase of the valve timing is fixed to a given state. The ECU 80 makes the decision at step 140 based on two failure flags XVFA and XVFR. One failure flag XVFA indicates whether or not failure has occurred with the advanced valve timing state. The other failure flag XVFR indicates whether or not failure has occurred with the retarded valve timing state. When one of the failure flags XVFA and XVFR is "1", the ECU 80 determines that the VVT 25 is failing. The ECU 80 sets those failure flags XVFA and XVFR according to a "failure detection routine" to be discussed later.

When the VVT 25 is failing at step 140, the ECU 80 proceeds to step 145. At this step 145, the ECU 80 sets the initial value GDVTHI, stored in the ROM 82, as a new sustaining duty learning value GDVTH. This routine initializes the learning value GDVTH to a predetermined value when the VVT 25 is in failure. This routine allows the learning value GDVTH to be initialized to the predetermined value when the VVT 25 has recovered from the failure state. The predetermined value is a value that controls the VVT 25 to relatively reduce the valve overlap as already described above. After the execution of step 145, the ECU 80 executes steps 155 and 160 in the same manner as has been discussed above.

While the VVT 25 is failing, therefore, the initial value GDVTHI is used as the learning value GDVTH in the computation of the drive duty ratio DVT. This control permits the valve timing to make the valve overlap relatively smaller.

When the VVT 25 is not failing at step 140, the value of the actual displacement angle VT and the value of the drive duty ratio DVT have converged to certain values with some difference between the value of the actual displacement angle VT and the value of the target displacement angle VTT. At this time, the ECU 80 executes the processes at steps 150, 155 and 160.

At step 150, the ECU 80 sets the previously computed value of the drive duty ratio DVT as the learning value GDVTH. The ECU 80 updates the learning value GDVTH with the value of the drive duty ratio DVT to thereby learn this learning value GDVTH. More specifically, the ECU 80 evaluates the result of the valve-timing sustaining control by comparing the values of both parameters VTT and VT with each other and learns the learning value GDVTH for correcting this sustaining control based on the evaluation. After the execution of step 150, the ECU 80 executes the processes at steps 155 and 160 in the same way as has been described above.

When the VVT 25 is not in failure, therefore, a new learning value GDVTH is used in the computation of the drive duty ratio DVT. The phase of the valve timing is controlled in such a way that the value of the actual displacement angle VT matches with the value of the target displacement angle VTT, thereby controlling the valve overlap.

When the difference between both parameters VTT and VT is equal to or smaller than the reference value α at step 120, the value of the actual displacement angle VT substantially coincides with the value of the target displacement angle VTT. To sustain the phase of the valve timing then, the ECU 80 executes the processes at steps 125 and 160.

At step 125, the ECU 80 sets the learning value GDVTH learned up to now as the value of the drive duty ratio DVT. At step 160, the duty control of the LSV 55 is executed in the same manner as has been discussed above based on the set value of the drive duty ratio DVT. In other words, when the value of the actual displacement angle VT nearly matches with the value of the target displacement angle VTT, the ECU 80 switches the value of the drive duty ratio DVT to be sent to the LSV 55 to the learning value GDVTH for sustaining the rotational phase of the cam shaft 10 constant. This learning value GDVTH is an instruction value that should be sent to the LSV 55 to inhibit the current supply of hydraulic pressure to both hydraulic pressure chambers 49 and 50 from changing. As mentioned earlier, the ECU 80 learns the learning value GDVTH to eliminate the influence of the allowances and time-dependent variations of the LSV 55 and VVT 25 from the valve-timing sustaining control. As the ECU 80 controls the LSV 55 based on this learning value GDVTH, the displacement angle of the cam shaft 10 is sustaining, without advancing or retarding, at the value of the target displacement angle VTT immediately before the sustaining starts. That is, the phase of the valve timing is sustained at the phase immediately before the sustaining starts. This control is the valve-timing sustaining control. After the execution of step 160, the ECU 80 starts again the sequence of processes from step 110 from the next control cycle.

Figure 10:
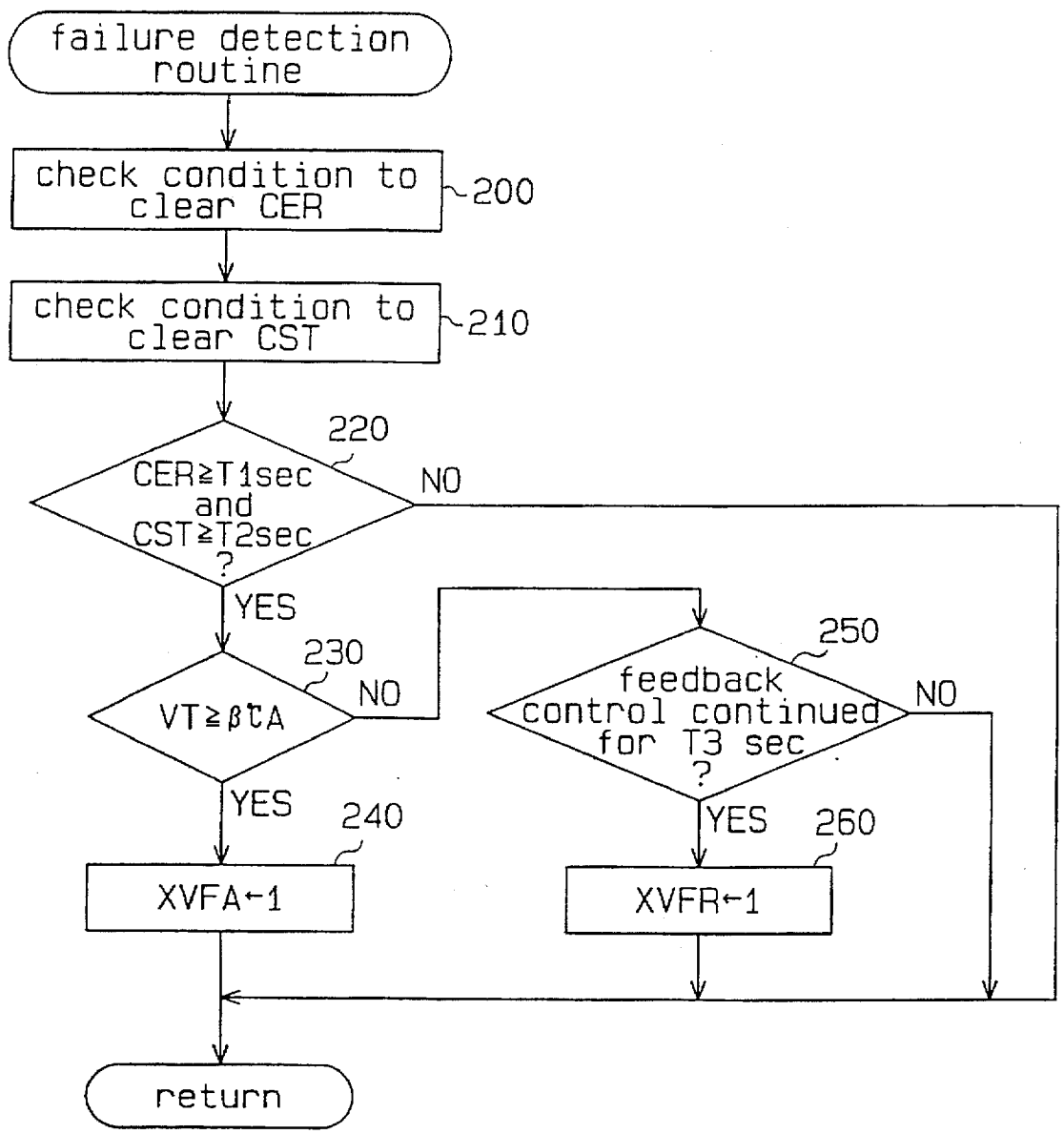
FIG. 10 is a flowchart illustrating a "failure detection routine"

FIG. 10 presents a flowchart illustrating the "failure detection routine" for detecting a failure in the VVT 25. The ECU 80 periodically executes this routine at predetermined crank angle intervals (e.g., every 240 degrees CA).

At step 200, the ECU 80 checks the condition for clearing the value of a first counter CER. When the difference between the value of the actual displacement angle VT and the value of the target displacement angle VTT is small, or when the engine 1 is running at a high speed or a low speed, the ECU 80 clears the value of this counter CER and restarts incrementing the counter value every 32 msec.

At step 210, the ECU 80 checks the condition for clearing the value of a second counter CST. When the value of the actual displacement angle VT varies greatly, the ECU 80 clears the value of this counter CST and restarts incrementing the counter value every 32 msec. At the same time, the ECU 80 resets the two failure flags XVFA and XVFR to "zero".

At step 220, the ECU 80 determines if the value of the first counter CER is equal to or greater than a predetermined reference value T1 if and the value of the second counter CST is equal to or greater than a predetermined reference value T2. For example, "5 seconds" may be used as both reference values T1 and T2. At this step, more specifically, the ECU 80 determines if the reference value T1 time has passed after the difference between the actual displacement angle VT and the target displacement angle VTT has increased and the reference value T2 time has passed after the actual displacement angle VT has stopped changing.

When the values of the individual counters CER and CST are each less than the reference values T1 and T2 at step 220, the ECU 80 considers that a failure of the VVT 25 is not detected and temporarily terminates the subsequent processing. When the values of the individual counters CER and CST are both equal to or greater than the reference values T1 and T2, the ECU 80 considers that the failure of the VVT 25 has been detected, and proceeds to step 230.

At step 230, the ECU 80 determines if the value of the actual displacement angle VT is equal to or greater than a predetermined reference value β, which may be set to "30 degrees CA". When the value of the actual displacement angle VT is equal to or greater than the predetermined reference value β, which means that the VVT 25 is failing with the phase of the valve timing advanced to a certain degree, the ECU 80 sets the failure flag XVFA to "1" at step 240 and then temporarily terminates the subsequent process. When the value of the actual displacement angle VT is less than the predetermined reference value β, the ECU 80 proceeds to step 250.

At step 250, the ECU 80 determines if the state of the valve timing in the feedback control has continued for a predetermined reference time value T3, which may be set to "5 seconds". When the state has not continued for the reference time T3, the ECU 80 temporarily terminates the subsequent processing. When the state has continued for the reference time value T3, which means that the VVT 25 is failing with the phase of the valve timing retarding to a certain degree, the ECU 80 sets the failure flag XVFR to "1" at step 260 and then temporarily terminates the subsequent process.

In this manner, the failure of the VVT 25 is detected and the failure flags XVFA and XVFR are set based on the detection result. As mentioned earlier, the ECU 80 uses the failure flags XVFA and XVFR to determine the failure of the VVT 25 in "valve timing control routine".

The action and advantages of the valve timing control apparatus with the above-described structure will be now described.

When the engine 1 is running, the intake valve 8 and the exhaust valve 9 actuate in synchronism with the rotation of the crank shaft 1a. The actuations of those valves 8 and 9 allow the respective intake port 6a and exhaust port 7a to selectively open or close, thus regulating the air intake into and discharge from the combustion chambers 4. At this time, the ECU 80 computes the value of the optimal target displacement angle VTT associated with the valve timing control by referring to the function data shown in FIG. 6. Based on the computed value of the target displacement angle VTT, the ECU 80 computes the value of the drive duty ratio DVT. Based on the value of the drive duty ratio DVT, the ECU 80 controls the LSV 55 to control the VTT 25. As a result, the valve timing of the intake valve 8 is altered to acquire the valve overlap that corresponds with the running condition of the engine 1.

When the engine speed NE is relatively high and the load LD is relatively high, the VVT 25 is controlled to increase the valve overlap. This control permits the utilization of the inertia of the air flowing through the air-intake passage 6 to enhance the efficiency of the supply of air into the combustion chambers 4 and improve the output power of the engine 1. When the engine speed NE is low and the load LD is low, the VVT 25 is controlled to decrease the valve overlap. This reduces the ratio of the internal EGR in the combustion chambers 4 to prevent the improper combustion of the flammable air-fuel mixture. Even when the engine speed NE and the load LD have other relationships, this controller seeks the optimal valve overlap to improve the output power of the engine 1 and prevent improper combustion.

When the value of the actual displacement angle VT becomes close to the value of the target displacement angle VTT, the ECU 80 controls the VTT 25 by controlling the LSV 55 so as to sustain the phase of the valve timing. That is, the ECU 80 executes the valve-timing sustaining control. When the phase of the valve timing is sustained at a given state, the ECU 80 compares the values of both parameters VTT and VT with each other to evaluate the result of the sustaining control and learns the learning value GDVTH for correcting this sustaining control based on the evaluation.

Figure 8:
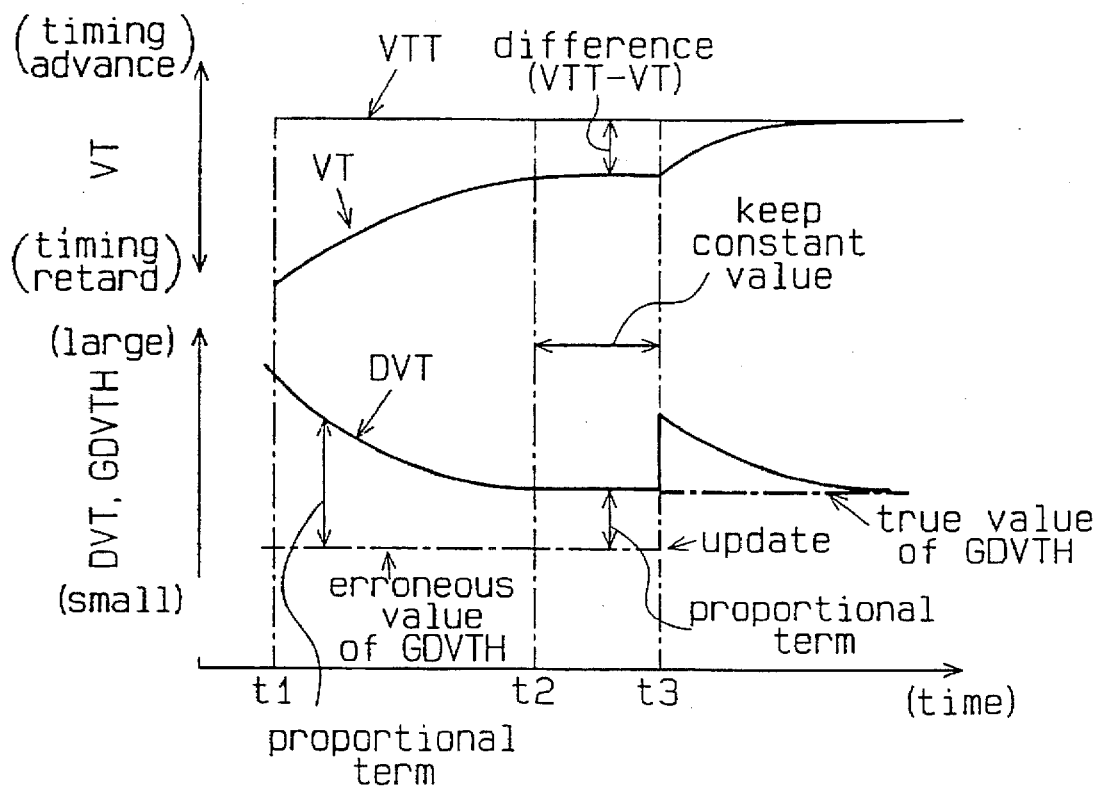
FIG. 8 is a chart showing the behaviors of various parameters over time.

The relationship among the various parameters VTT, VT, DVT, GDVTH, etc. will be now described by referring to FIGS. 7 and 8. FIG. 7 presents the graph illustrating the characteristics of the LSV 55. FIG. 8 presents a timing chart showing the behaviors of various parameters VT, DVT, GDVTH, etc. when the value of the target displacement angle VTT is set constant. In this example, it is assumed that the current learning value GDVTH is an "erroneous value" smaller than the "true value" as shown in FIG. 7. With reference to FIG. 8, a description will be given of the behaviors of various parameters VT, DVT, GDVTH, etc. while the learning value GDVTH is updated to the true value from an erroneous value.

Between time t1 and time t2, the actual displacement angle VT is retarding from the target displacement angle VTT. The feedback control therefore allows the value of the actual displacement angle VT to change toward advancement so as to gradually approach the value of the target displacement angle VTT. That is, the value of the drive duty ratio DVT, which is the sum of the proportional term that is determined by the difference (VTT–VT) and the learning value GDVTH, gradually decreases while this value is greater than the learning value GDVTH and the value of the target displacement angle VTT also gradually changes toward advancement. The proportional term decreases as the difference (VTT–VT) decreases.

At time t2, the value of the drive duty ratio DVT becomes equal to the true value of the learning value GDVTH. Until time t3 thereafter, the actual displacement angle VT is constant with the difference (VTT–VT) remaining constant, i.e., without converging to the value of the target displacement angle VTT. During this period of time, the drive duty ratio DVT is also constant.

At time t3, a predetermined time has passed after the values of both parameters VT and DVT became constant. It is possible to consider at this time that the value of the drive duty ratio DVT is the true value of the learning value GDVTH, so that this value is updated as the learning value GDVTH. At this time, the value of the drive duty ratio DVT becomes greater than the learning value GDVTH by the proportional term. As the value of the drive duty ratio DVT gradually decreases toward the learning value GDVTH thereafter, the value of the actual displacement angle VT finally converges to the value of the target displacement angle VTT. Accordingly, the value of the actual displacement angle VT or the phase of the valve timing is sustained at the value of the target displacement angle VTT under the sustaining control.

The learning control involving the learning value GDVTH is executed in the above-described manner, and the sustaining control is corrected based on the learning result.

At the time of initiating the learning, the ECU 80 uses the initial value GDVTHI as the learning value GDVTH. This initial value GDVTHI has been set so that the VVT 25 relatively reduces the valve overlap.

If the learning control starts for the first time when the engine 1 is activated for the first time or when the engine 1 is activated for the first time after the replacement of the battery, the sustaining control is corrected by the initial value GDVTHI. Until the initial learning once started is temporarily completed, the valve overlap does not increase excessively under the sustaining control even by the mechanical allowances of the VVT 25 and the LSV 55, etc., and the amount of the exhaust gas remaining in the combustion chambers 4 does not increase. It is thus possible to prevent misfire or engine stalling due to an increase in the internal EGR. By employing the learning control in the sustaining control, therefore, the influence of the allowances of the VVT 25 and the LSV 55, etc. are eliminated from the sustaining control. In addition, the optimal learning control can be executed in the sustaining control until new learning, once started, is temporarily completed.

When the ECU 80 determines that the VVT 25 has recovered from the failure state, the ECU 80 initializes the learning value GDVTH to a predetermined value under the learning control. That is, while the VVT 25 is in failure, the ECU 80 keeps using the initial value GDVTHI in the calculation of the drive duty ratio DVT. When the VVT 25 recovers from the failure state, the ECU 80 updates, as the learning value GDVTH, the value of the drive duty ratio DVT computed immediately before the recovery using the initial value GDVTHI as one parameter. As a result, the learning value GDVTH is initialized to the predetermined value.

The learning value GDVTH is not erroneously learned while the VVT 25 is in failure. The sustaining control does not cause the phase of the valve timing to be improperly set during the period from immediately after the recovery from the failure to the temporary termination of the learning of the learning value GDVTH. Consequently, the valve overlap does not become excessively large, thus preventing misfire or engine stalling from occurring due to the internal EGR. During the period from the point when new learning starts after recovery from a failure and to the point when the learning is temporarily completed, it is possible to prevent the valve timing control from deteriorating due to an erroneous learning value GDVTH and to execute the optimal learning control to control the valve timing. Because the initial value GDVTHI is used in computing the drive duty ratio DVT while the VVT 25 is in failure, the learning value GDVTH is adequate for the control of the valve timing during the failure period.

To avoid erroneous learning of the learning value GDVTH when the failure of the VVT 25 is detected, the learning may be inhibited. To detect the failure of the. VVT 25, however, it is necessary to determine that the phase of the valve timing is constant for a given period of time. Further, it is generally desirable that the reference time needed to determine the detection of the failure of the VVT 25 should be greater than the reference time needed to determine the renewal of the learning value GDVTH. If the learning of the learning value GDVTH is inhibited after detection of the failure of the VVT 25, therefore, it is not possible to prevent erroneous learning of the learning value GDVTH during the period from the occurrence of the failure to the detection of the failure. In this respect, the initialization of the learning value GDVTH as in this embodiment is advantageous.

In this embodiment, the ECU 80 executes the sustaining control as needed so that the angle of the cam shaft 10 changed by the VVT 25 can be reliably maintained at the value of the target displacement angle VTT immediately before the initiation of the sustaining control. Moreover, the ECU 80 learns the learning value GDVTH that is used in the sustaining control. Therefore, the influence of the allowances or time-dependent changes of the VVT 25 and LSV 55 can be eliminated from the learning value GDVTH, thus always ensuring the optimal sustaining control.

In this embodiment, the ECU 80 uses the learning value GDVTH as one parameter to compute the drive duty ratio DVT in feedback control (other than the sustaining control). Even in the feedback control, therefore, the influence of the allowances or time-dependent changes of the VVT 25 and LSV 55 can be eliminated from the drive duty ratio DVT, so that the optimal feedback control will always be attained.

A specific valve timing control apparatus for an engine according to the second embodiment of this invention will be now described with reference to FIGS. 11 and 12. To avoid a redundant description, like or same reference numerals are given to corresponding components of this embodiment. The following will therefore mainly discuss the differences from the first embodiment.

The second embodiment differs from the first embodiment in the content of the learning control of the learning value GDVTH. FIGS. 11 and 12 present flowcharts illustrating the contents of the "valve timing control routine" of this embodiment. The contents of steps 110, 112, 113, 115, 117, 118, 120, 125, 155 and 160 in the routine in FIG. 11 are the same as those of the corresponding steps in the routine in FIG. 9. In the second embodiment, the content of the process of learning the learning value GDVTH at step 300 in FIG. 11 differs from the contents of steps 130, 135, 140, 145 and 150 in FIG. 9.

Figure 12:
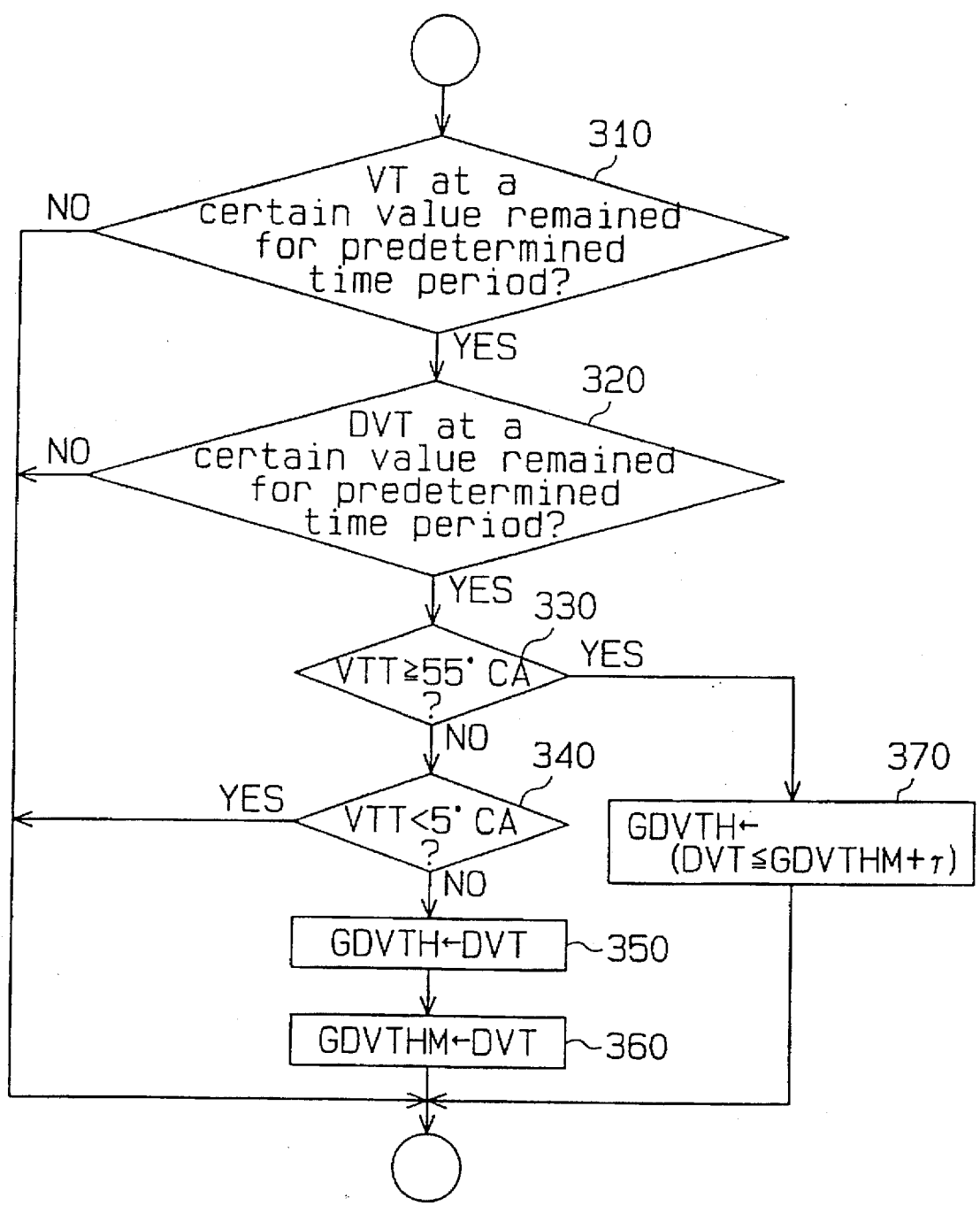
FIG. 12 is a flowchart for explaining a part of the flowchart in FIG. 11 in detail.
Figure 13:
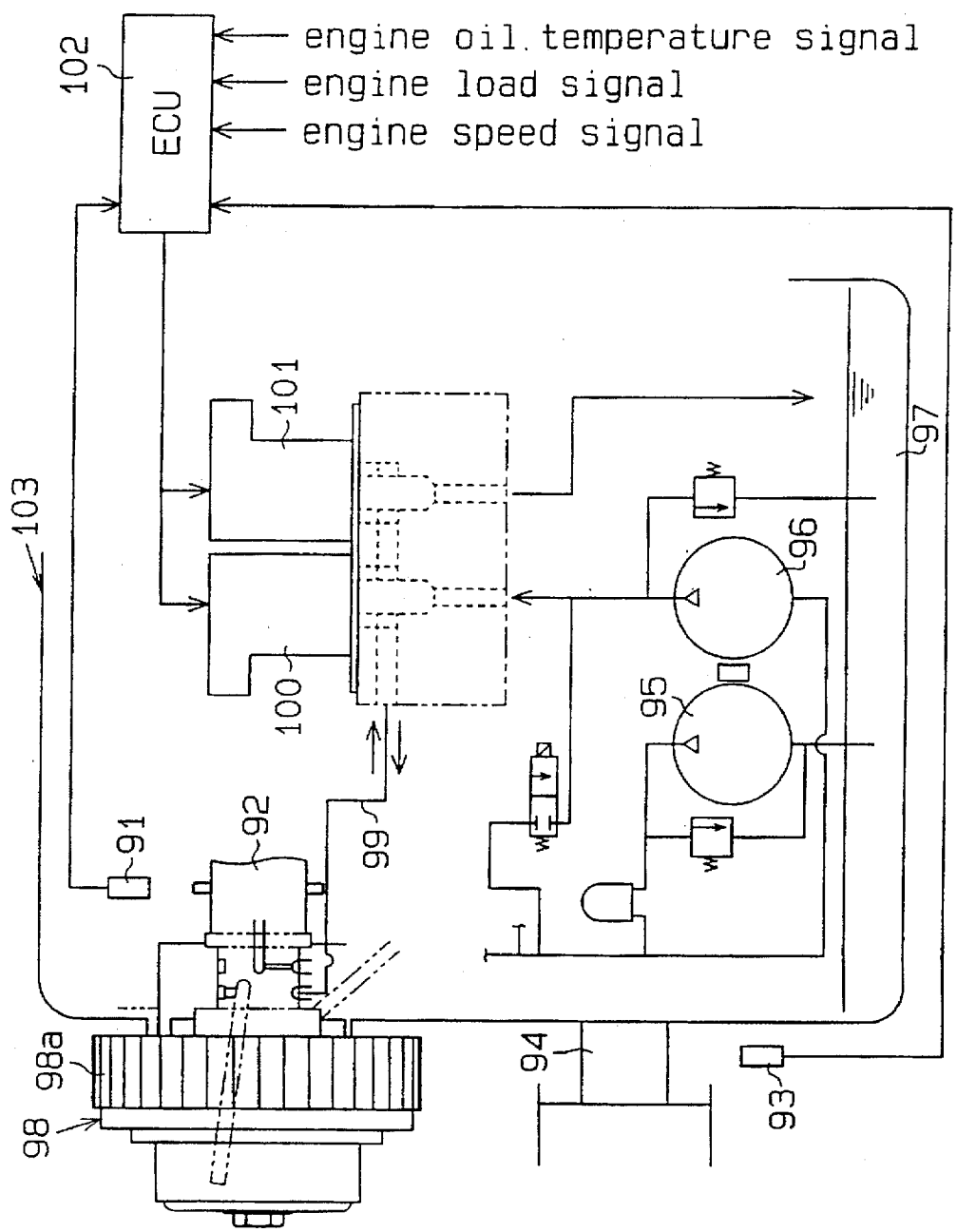
FIG. 13 is a schematic structural diagram showing a conventional valve timing control apparatus.

FIG. 12 illustrates the details of step 300. At step 310, the ECU 80 determines if the value of the actual displacement angle VT has converged to a certain value and has remained unchanged for a predetermined time. When the real change opening VT at the certain value has not remained unchanged during the predetermined time, which means that the value of the opening VT is changing, the ECU 80 executes the processes at steps 155 and 160. When the actual displacement angle VT at the certain value has remained unchanged during the predetermined time, which means that the value of that angle VT has converged to the certain value, the ECU 80 proceeds to step 320.

At step 320, the ECU 80 determines if the value of the drive duty ratio DVT has converged to a certain value and remained unchanged for a predetermined time period. When the certain value of the drive duty ratio DVT has not remained unchanged during the predetermined time period, which means that the ratio DVT is changing, the ECU 80 executes the processes at steps 155 and 160. When the certain value of the drive duty ratio DVT remained unchanged has for the predetermined time period, which means that the ratio DVT has converged to a certain value, the ECU 80 proceeds to step 330.

At step 330 proceeded from step 320, the ECU 80 determines if the currently computed value of the target displacement angle VTT is equal to or greater than "55 degrees CA". This value "55 degrees CA" is exemplary. As mentioned earlier, the value of the target displacement angle VTT is set in the range of "zero to 60 degrees CA" in the function data shown in FIG. 6. In this example, therefore, the ECU 80 determines if the value of the target displacement angle VTT lies within the range from "60 degrees CA" which is equivalent to the upper limit (most advanced timing) to "55 degrees CA". When the value of the target displacement angle VTT is equal to or greater than "55 degrees CA", the ECU 80 proceeds to step 370. When the value of the target displacement angle VTT is less than "55 degrees CA", the ECU 80 proceeds to step 340.

At step 340, the ECU 80 determines if the currently computed value of the target displacement angle VTT is smaller than "5 degrees CA". This value "5 degrees CA" is exemplary. In this example, therefore, the ECU 80 determines if the value of the target displacement angle VTT lies within the range from "zero degree CA" which is equivalent to the lower limit (most retarded timing) to "5 degrees CA". When the value of the target displacement angle VTT is smaller than "5 degrees CA", the ECU 80 proceeds directly to step 155. When the value of the target displacement angle VTT is equal to or greater than "5 degrees CA", the ECU 80 proceeds to step 350.

At step 350, the ECU 80 sets the previously computed value of the drive duty ratio DVT as the learning value GDVTH. The ECU 80 updates the learning value GDVTH with the value of the drive duty ratio DVT to thereby learn this learning value GDVTH. After the execution of step 350, the ECU 80 executes the processes at steps 155 and 160 in the same way as has been described earlier.

At step 360, the ECU 80 temporarily stores the previously computed value of the drive duty ratio DVT as a sustaining duty learning value GDVTHM in the RAM 83, after which the ECU 80 proceeds to step 155.

When the value of the target displacement angle VTT is smaller than "5 degrees CA" at step 340, the ECU 80 proceeds directly to step 155 without learning and updating the sustaining duty learning value GDVTH at step 350, i.e., after inhibiting the learning process.

When the value of the target displacement angle VTT is equal to or greater than "55 degrees CA" at step 330, the ECU 80 learns and updates the learning value GDVTH at step 370, and then proceeds to step 155. When the previously computed value of the drive duty ratio DVT is equal to or smaller than "GDVTHM+γ" which is the latest stored sustaining duty learning value GDVTHM plus a predetermined compensation value γ, the ECU 80 sets the value of "GDVTHM+γ" as the learning value GDVTH. It is to be noted that the compensation value γ is a value for restricting the allowable limits (upper limit value) of the learning value GDVTH. That is, learning of the learning value GDVTH is restricted by the value obtained by adding the compensation value γ to the stored learning value GDVTHM, which has been learned when the value of the target displacement angle VTT was out of the range "55 to 60 degrees CA". The above are the detailed contents of step 300.

In this embodiment, it is assumed that when the value of the target displacement angle VTT lies within the range of "zero to 5 degrees CA", which is close to the most retarded angle, the VVT 25 does not move due to a mechanical restriction, and the ECU 80 thus inhibits the learning of the sustaining duty learning value GDVTH when the value of the target displacement angle VTT is in that range. When the value of the target displacement angle VTT is close to "zero degrees CA", the limit in the most retarded direction, therefore, the learning of the learning value GDVTH is not performed.

Generally speaking, when the value of the target displacement angle VTT is close to "zero degrees CA", the ring gear 48 in the VVT 25, which is controlled according to that value, is at one end position of its travel range so that the VVT 25 becomes temporarily inoperable due to a mechanical restriction. This restriction slightly varies depending on a productional variation of the VVT 25 in use. Suppose that the end position in the travel range of the ring gear 48 corresponds to "2 degrees CA," slightly deviated from "zero degree CA", the target displacement angle VTT to which that end position should correspond.

If the value of the actual displacement angle VT (2 degrees CA) does not match with the value of the target displacement angle VTT (zero degrees CA) before and after the temporary halting of the VVT 25 due to a mechanical restriction, an erroneous sustaining duty learning value GDVTH may be learned based on this actual displacement angle VT (2 degrees CA). In this embodiment, however, learning the learning value GDVTH is inhibited when the value of the target displacement angle VTT is close to the most retarded angle. When the VVT 25 temporarily becomes unmovable, an erroneous learning value GDVTH is not learned and the phase of the valve timing is not set to the improper phase by the sustaining control. Therefore, the optimal learning control for the sustaining control can be executed in consideration of the possibility that the VVT 25 is unmovable because of a mechanical restriction. In other words, the valve overlap, which should be minimized, will not become unnecessarily large and the internal EGR of the engine 1 will not increase unnecessarily. It is thus possible to prevent misfire or engine stalling from occurring by a variation in the internal EGR in the engine 1.

According to this embodiment, when the value of the target displacement angle VTT lies within the range of "55 to 60 degrees CA" which is close to the most advanced angle, the learning of the sustaining duty learning value GDVTH is restricted based on the sustaining duty learning value GDVTH (GDVTHM), which has been learned when the value of the target displacement angle VTT was out of the range "55 to 60 degrees CA". When the value of the target displacement angle VTT is close to one allowable limit "60 degrees CA", the most advanced angle, the learning of the learning value GDVTH is performed while this learning is restricted based on the effective learning value GDVTH, which has been learned when the value of the target displacement angle VTT was off the range "55 to 60 degrees CA".

When the value of the target displacement angle VTT is close to one allowable limit "60 degrees CA", the ring gear 48 in the VVT 25, which is controlled according to that value, is at one end position of its movable range so that the VVT 25 becomes temporarily unmovable due to a mechanical restriction. According to this embodiment, the learning of the learning value GDVTH is permitted in such a degree that erroneous learning does not progress unnecessarily under the condition that the VVT 25 is temporarily inoperable or that the value of the target displacement angle VTT is close to "60 degrees CA" in the most advanced angle direction. It is therefore possible to converge the value of the actual displacement angle VT to the value of the target displacement angle VTT even under the above condition, so that the sustaining control does not improperly set the phase of the valve timing. Therefore, the optimal learning control for the sustaining control can be executed in consideration of the possibility that the VVT 25 is unmovable because of a mechanical restriction. That is, the valve overlap, which should be maximized, will not become unnecessarily small and the internal EGR of the engine 1 will not decrease unnecessarily. It is thus possible to make the best use of the internal EGR acquired by the valve overlap control to thereby prevent engine emissions or the deterioration of fuel mileage.

According to this embodiment, when the valve timing is controlled to the most advanced angle to acquire the maximum valve overlap, attention is paid to the emissions of the engine 1 or the deterioration of fuel mileage. The ECU 80 allows the learning of the value GDVTH under a predetermined condition so that the value of the actual displacement angle VT is convergeable to the value of the target displacement angle VTT to a certain precision. When it is less important to converge the values of both parameters VT and VTT or when the valve timing is controlled to the most retarded timing to provide the minimum valve overlap, however, attention is paid to the prevention of engine misfire or engine stalling. In this case, the ECU 80 inhibits the learning of the value GDVTH to give the first priority to the prevention of erroneous learning of the learning value GDVTH.

Figure 11:
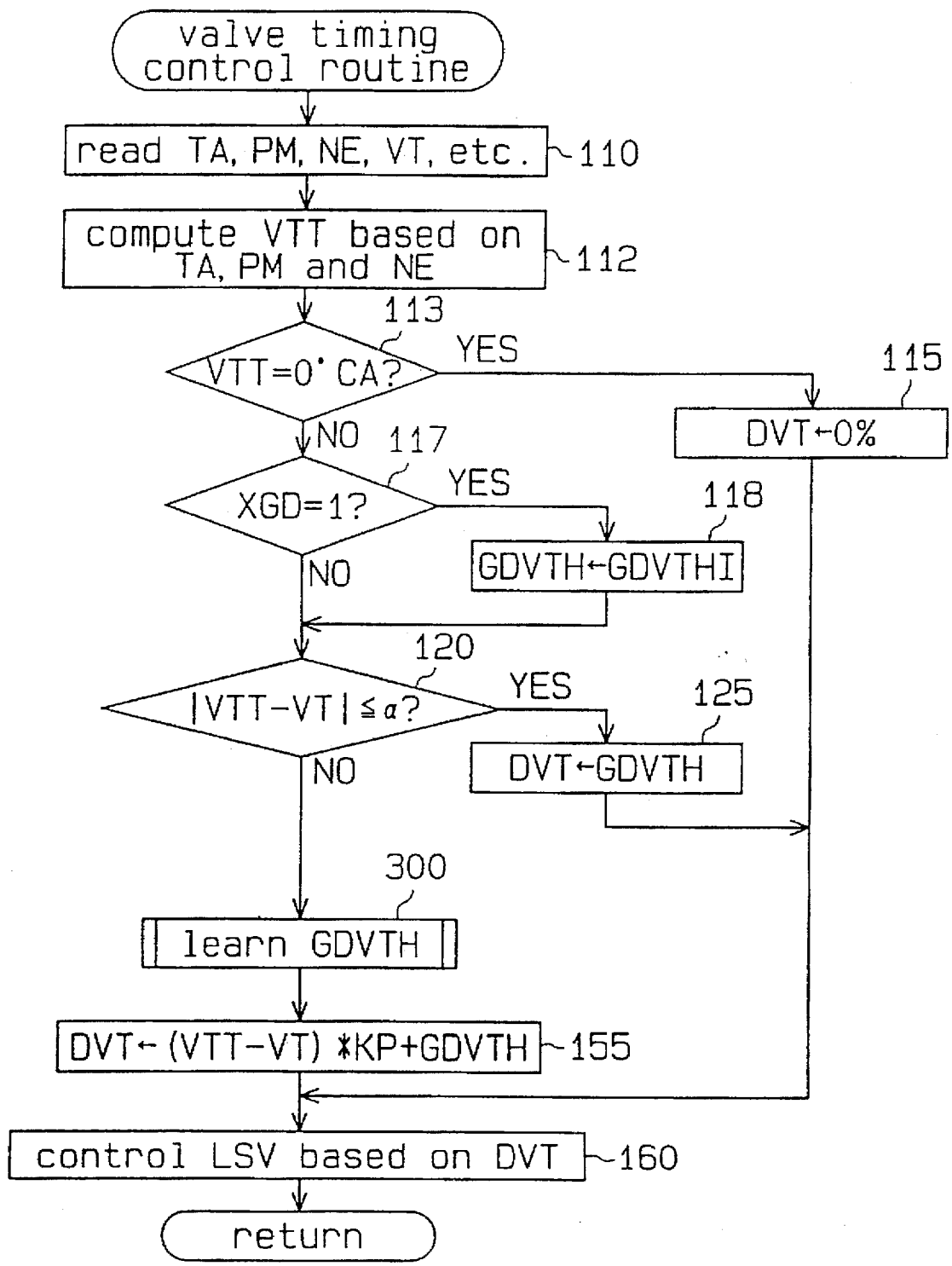
FIG. 11 is a flowchart illustrating a "valve timing control routine"

With regard to the content of the valve timing control in this embodiment, the action and advantages of the same structure as that of the first embodiment or the corresponding structure in the routines in FIGS. 9 and 11 are identical to those of the first embodiment.

Although only two embodiments of the present invention have been described so far, it should be apparent to those skilled in the art that the present invention may be embodied in many other specific forms without departing from the spirit or scope of the invention. Particularly, it should be understood that this invention may be embodied in the following forms in which the same action and advantages as provided by the above two embodiments are also obtained.

According to the above-described embodiments, the valve overlap is changed by altering only the valve timing of the intake valve 8 by means of the VVT 25 provided at the cam shaft 10 on the air intake side. The VVT may be provided at the cam shaft 11 on the exhaust side, so that the valve overlap is changed by altering only the valve timing of the exhaust valve 9 by means of this VVT. Alternatively, VVTs may be provided at the cam shafts 10 and 11 on both the air-intake side and exhaust side, so that the valve overlap is changed by altering the valve timings of the intake valve 8 and exhaust valve 9 by means of those VVTs.

According to the first embodiment, when the VVT 25 has recovered from a failure, the learning value GDVTH is initialized with the value of the drive duty ratio DVT, which has been computed based on the initial value GDVTHI immediately before the recovery. The sustaining duty learning value GDVTH may be initialized with the initial value GDVTHI only when the VVT 25 is recovered from a failure. Alternatively, the learning value GDVTH may be initialized with the learning value GDVTH that was learned to surely actuate the VVT 25 immediately before the detection of a failure when the VVT 25 is recovered from the failure.

Steps 140 and 145 in the flowchart of the first embodiment illustrated in FIG. 9 may be omitted. Alternatively, steps 117 and 118 in the same flowchart may be omitted. The valve timing control apparatus may be designed to simply control the valve timing regardless of the valve overlap, instead of the above-described apparatus, which controls the valve overlap by controlling the valve timing.

According to the second embodiment, when the value of the target displacement angle VTT is close to the value of the most advanced timing or one allowable limit, the learning of the value GDVTH is permitted while restricting the learning process under a predetermined condition. Further, when the value of the target displacement angle VTT is close to the value of the most retarded angle or the other allowable limit, the learning of the value GDVTH is inhibited. The apparatus may be modified in such a manner that when the value of the target displacement angle VTT is close to the value of the most retarded timing, however, the learning of the value GDVTH is permitted while restricting the learning process under a predetermined condition. Alternatively, when the value of the target displacement angle VTT is close to the value of the most advanced angle, the learning of the value GDVTH may be inhibited.

Therefore, the present examples and embodiments are to be considered as illustrative and not restrictive and the invention is not to be limited to the details given herein, but may be modified within the scope of the appended claims.

What is claimed is:

1. A valve timing control apparatus for an engine having an air intake passage for introducing air to a combustion chamber and an air exhausting passage for exhausting gas from the combustion chamber, said intake passage and said exhausting passage having an intake valve and an exhaust valve, respectively, the valves being alternately opened and closed with a valve timing according to rotation of a cam shaft, which rotates in synchronism with rotation of a crank shaft of the engine, wherein the valves are simultaneously opened during a period of a valve overlap, and wherein the rotational phase of the cam shaft is arranged to be selectively advanced or retarded with respect to the rotational phase of the crank shaft to converge the valve timing to a target value so as to vary the period of the valve overlap within a range between a maximum value and a minimum value based on a current running condition of the engine, said apparatus comprising:

adjusting means for continuously adjusting the valve timing of at least one of the intake valve and the exhaust valve, said adjusting means being driven by hydraulic pressure;

supplying means for supplying the hydraulic pressure to said adjusting means, said supplying means including tuning means for tuning the hydraulic pressure;

first detecting means for detecting the running condition of the engine;

computing means for computing the target value based on said running condition;

second detecting means for detecting the actual valve timing adjusted by the adjusting means;

control means for controlling the supplying means to operate the adjusting means so as to converge the detected valve timing to the target value and vary the period of the valve overlap based on the running condition of the engine, wherein said control means controls the supplying means to sustain the valve timing when it is approximately coincided with the target value;

determining means for determining an offset between the detected valve timing and the target value when the valve timing is sustained by said control means for a predetermined time period, said determining means including calculating means for calculating an offset value between the valve timing and the target value;

correction means for correcting said target value with a current specific value for cancelling the offset value, said correction means being arranged to compute the current specific value based on said offset value;

said computed target value being variable within a predetermined range between an upper limit and a lower limit;

restricting means for restricting said correction means to compute the current specific value, based on a predetermined value, when the computed target value is within said predetermined range; and wherein said predetermined value is one of the current specific values computed by said correction means when said computed target value is out of said predetermined range.

2. The apparatus according to claim 1, wherein said computed target value within the predetermined range is a value that advances the controlled valve timing to the limit thereof.

3. The apparatus according to claim 2, wherein said valve timing is adjustable between two limits, and wherein said control means controls the supplying means to advance the valve timing of the intake valve to one of said limits so as to maximize the period of the valve overlap, and wherein said control means controls the supplying means to retard the valve timing of the intake valve to the other one of said limits so as to minimize the period of the valve overlap.

4. The apparatus according to claim 3, wherein said adjusting means includes:

a cam shaft rotatable in association with the crank shaft for actuating at least one of the intake valve and the exhaust valve;

a timing pulley provided on said cam shaft for transmitting torque of the crank shaft to the cam shaft;

a ring gear for coupling the cam shaft to the timing pulley to cause a rotational phase difference between the cam shaft and the timing pulley based on movement of the ring gear in an axial direction thereof; and wherein said supplying means applies said hydraulic pressure to said ring gear to position the ring gear.

5. The apparatus according to claim 4, wherein said supplying means includes:

a hydraulic pump for applying hydraulic pressure to said ring gear; and wherein said tuning means is an electromagnetic valve for tuning the hydraulic pressure.

6. The apparatus according to claim 5, wherein said first detecting means includes:

a first sensor for detecting a rotational speed of the crank shaft; and a second sensor for detecting a pressure in said air intake passage.

7. The apparatus according to claim 6, wherein said computing means computes said target value based on said detected rotational speed of the crank shaft and said detected pressure in the intake passage.

8. The apparatus according to claim 7, wherein said computing means, said control means, said correction means, said determining means and said restricting means constitute an electronic control unit having an input signal circuit, a memory, an operation circuit and an output signal circuit.

* * * * *